(12) United States Patent
Kamikawabata et al.

(10) Patent No.: US 12,142,966 B2
(45) Date of Patent: Nov. 12, 2024

(54) ROTOR CORE, ROTOR, AND ROTATING ELECTRIC MACHINE

(71) Applicant: NIPPON STEEL CORPORATION, Tokyo (JP)

(72) Inventors: Masahito Kamikawabata, Tokyo (JP); Miho Tomita, Tokyo (JP); Tesshu Murakawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 262 days.

(21) Appl. No.: 17/775,728

(22) PCT Filed: Nov. 13, 2020

(86) PCT No.: PCT/JP2020/042444
§ 371 (c)(1),
(2) Date: May 10, 2022

(87) PCT Pub. No.: WO2021/095849
PCT Pub. Date: May 20, 2021

(65) Prior Publication Data
US 2022/0385118 A1    Dec. 1, 2022

(30) Foreign Application Priority Data

Nov. 15, 2019 (JP) ................................ 2019-206676

(51) Int. Cl.
*H02K 1/02* (2006.01)
*C22C 38/00* (2006.01)
(Continued)

(52) U.S. Cl.
CPC ............. *H02K 1/02* (2013.01); *C22C 38/001* (2013.01); *C22C 38/002* (2013.01); *C22C 38/02* (2013.01);
(Continued)

(58) Field of Classification Search
CPC ...... H02K 1/02; H02K 2213/03; H02K 1/246; H02K 1/22; H02K 19/10; C22C 38/001;
(Continued)

(56) References Cited

U.S. PATENT DOCUMENTS

| | | | | |
|---|---|---|---|---|
| 5,605,582 | A * | 2/1997 | Inoue | H01J 29/07 148/333 |
| 2009/0202383 | A1* | 8/2009 | Tanaka | C22C 38/004 148/624 |
| 2010/0084054 | A1* | 4/2010 | Yokoi | C22C 38/02 148/333 |
| 2012/0169267 | A1 | 7/2012 | Nashiki et al. | |

(Continued)

FOREIGN PATENT DOCUMENTS

| | | |
|---|---|---|
| JP | 8-223830 A | 8/1996 |
| JP | 10-257702 A | 9/1998 |

(Continued)

OTHER PUBLICATIONS

JP2019178380; Tomita Miho et al. (Year: 2019).*

*Primary Examiner* — Ahmed Elnakib
(74) *Attorney, Agent, or Firm* — Birch, Stewart, Kolasch & Birch, LLP

(57) ABSTRACT

An electrical steel sheet (300) is formed such that centerlines of four magnetic poles (salient poles) of a rotor core (111) coincide with a direction of easy magnetization (ED1) or (ED2). In addition, the electrical steel sheets (300) are laminated such that the directions of easy magnetization (ED1) and (ED2) are aligned.

20 Claims, 12 Drawing Sheets

(51) Int. Cl.
*C22C 38/02* (2006.01)
*C22C 38/04* (2006.01)
*C22C 38/06* (2006.01)
*C22C 38/08* (2006.01)
*C22C 38/10* (2006.01)
*C22C 38/16* (2006.01)
*C22C 38/60* (2006.01)

(52) U.S. Cl.
CPC .............. *C22C 38/04* (2013.01); *C22C 38/06* (2013.01); *C22C 38/08* (2013.01); *C22C 38/10* (2013.01); *C22C 38/16* (2013.01); *C22C 38/60* (2013.01); *C22C 2202/02* (2013.01)

(58) Field of Classification Search
CPC ....... C22C 38/002; C22C 38/02; C22C 38/04; C22C 38/06; C22C 38/08; C22C 38/10; C22C 38/16; C22C 38/60; C22C 2202/02; C22C 38/004; C21D 1/30; C21D 1/76; C21D 6/005; C21D 8/1222; C21D 8/1238; C21D 8/1266; C21D 9/46; C21D 8/1216; H01F 1/14775; H01F 1/147
See application file for complete search history.

(56) References Cited

U.S. PATENT DOCUMENTS

| | | | |
|---|---|---|---|
| 2015/0037610 A1* | 2/2015 | Hata .................... | C21D 9/46 148/333 |
| 2015/0114527 A1* | 4/2015 | Omura ................ | C22C 38/04 148/330 |
| 2022/0384085 A1* | 12/2022 | Hirayama .............. | C22C 38/10 |
| 2022/0385118 A1* | 12/2022 | Kamikawabata ....... | C22C 38/60 |
| 2022/0385119 A1* | 12/2022 | Kamikawabata ........ | C21D 9/46 |
| 2022/0407371 A1* | 12/2022 | Ohsugi ................. | C22C 38/06 |
| 2023/0106818 A1* | 4/2023 | Fukuchi ............... | C22C 38/004 148/307 |
| 2023/0407427 A1* | 12/2023 | Yonemura .............. | C22C 38/58 |
| 2024/0035130 A1* | 2/2024 | Fukuchi ................. | C22C 38/02 |
| 2024/0043970 A1* | 2/2024 | Fukuchi ................. | C22C 38/06 |
| 2024/0047106 A1* | 2/2024 | Fukuchi ................. | C22C 38/10 |

FOREIGN PATENT DOCUMENTS

| | | |
|---|---|---|
| JP | 2012-114975 A | 6/2012 |
| JP | 2016-192841 A | 11/2016 |
| JP | 2017-135878 A | 8/2017 |
| JP | 2019-178380 A | 10/2019 |
| KR | 10-0973627 B1 | 8/2010 |

* cited by examiner

ROTOR CORE, ROTOR, AND ROTATING ELECTRIC MACHINE

TECHNICAL FIELD OF THE INVENTION

The present invention relates to a rotor core, a rotor, and a rotating electric machine that are particularly preferably used in reluctance motors and reluctance generators.

Priority is claimed on Japanese Patent Application No. 2019-206676, filed in Japan on Nov. 15, 2019, the content of which is incorporated herein by reference.

BACKGROUND ART

Ordinarily, in reluctance motors, no magnets are used in the rotors. Therefore, in reluctance motors, costly rare earths are not essential. From such a viewpoint, recently, reluctance motors have been attracting attention.

In reluctance motors, a rotor and a stator are disposed such that magnetic poles of the rotor and the stator face each other, and exciting currents flowing through a plurality of exciting coils coiled around the stator are sequentially switched, thereby generating a magnetic attractive force in the rotation direction (circumferential direction) in the rotor to rotate the rotor.

As reluctance motors, there are switched reluctance motors and synchronous reluctance motors (for example, refer to Patent Documents 1 and 2). As described in Patent Documents 1 and 2, in a reluctance motor, magnetic poles of a rotor are configured by providing salient poles (protrusions) disposed at intervals in the circumferential direction or by forming slits in a rotor core.

PRIOR ART DOCUMENT

Patent Document

[Patent Document 1] Japanese Unexamined Patent Application, First Publication No. 2012-114975
[Patent Document 2] Japanese Unexamined Patent Application, First Publication No. 2017-135878

DISCLOSURE OF THE INVENTION

Problems to be Solved by the Invention

However, in the techniques described in Patent Documents 1 and 2, there are no studies regarding the electrical steel sheet that is used for the rotor core. Therefore, there is room for improvement in magnetic characteristics in conventional rotor cores. This is also true not only for reluctance motors but also for reluctance generators.

The present invention has been made in view of the above-described problem, and an object of the present invention is to improve the magnetic characteristics of rotor cores that are used in reluctance motors or reluctance generators.

Means for Solving the Problem

In order to solve the above-described problems, the present invention employs the following configurations.

(1) A rotor core according to one aspect of the present invention is a rotor core of a reluctance motor or a reluctance generator and is a rotor core having a plurality of electrical steel sheets, in which the electrical steel sheet has a chemical composition containing, by mass %, C: 0.0100% or less, Si: 1.50% to 4.00%, sol. Al: 0.0001% to 1.0%, S: 0.0100% or less, N: 0.0100% or less, one or more selected from the group consisting of Mn, Ni, Co, Pt, Pb, Cu, and Au: 2.50% to 5.00% in total, Sn: 0.000% to 0.400%, Sb: 0.000% to 0.400%, P: 0.000% to 0.400%, and one or more selected from the group consisting of Mg, Ca, Sr, Ba, Ce, La, Nd, Pr, Zn, and Cd: 0.0000% to 0.0100% in total, in which, when a Mn content (mass %) is indicated by (Mn), a Ni content (mass %) is indicated by (Ni), a Co content (mass %) is indicated by (Co), a Pt content (mass %) is indicated by (Pt), a Pb content (mass %) is indicated by (Pb), a Cu content (mass %) is indicated by (Cu), an Au content (mass %) is indicated by (Au), a Si content (mass %) is indicated by (Si), and a sol. Al content (mass %) is indicated by (sol. Al), Formula (A) below is satisfied, and a remainder includes Fe and impurities, when a B50 in a rolling direction is indicated by B50L, a B50 in a direction at an angle of 90° with respect to the rolling direction is indicated by B50C, and, between B50 in two directions in which a smaller angle of angles with respect to the rolling direction is 45°, a B50 in one direction is indicated by B50D1, a B50 in the other direction is indicated by B50D2, Formula (B) and Formula (C) below are satisfied, and an X-ray random intensity ratio in {100}<011> is 5 or more and less than 30, and a sheet thickness is 0.50 mm or less.

$$((Mn)+(Ni)+(Co)+(Pt)+(Pb)+(Cu)+(Au))-((Si)+(sol.\ Al))>0\% \tag{A}$$

$$(B50D1+B50D2)/2>1.7T \tag{B}$$

$$(B50D1+B50D2)/2>(B50L+B50C)/2 \tag{C}$$

Here, the magnetic flux density B50 refers to a magnetic flux density when the tooth is excited with a magnetic field strength of 5000 A/m.

(2) The rotor core according to (1) above, in which the following formula (D) is satisfied.

$$(B50D1+B50D2)/2>1.1\times(B50L+B50C)/2 \tag{D}$$

(3) The rotor core according to (1) above, in which the following formula (E) is satisfied.

$$(B50D1+B50D2)/2>1.2\times(B50L+B50C)/2 \tag{E}$$

(4) The rotor core according to (1) above, in which the following formula (F) is satisfied.

$$(B50D1+B50D2)/2>1.8T \tag{F}$$

(5) A rotor of the present invention is a rotor of a reluctance motor or a reluctance generator, having the rotor core according to any one of (1) to (4) above, in which a centerline in a circumferential direction of at least one magnetic pole of the rotor coincides with a direction in which magnetic characteristics of at least one of the electrical steel sheets are most excellent, and the direction in which the magnetic characteristics are most excellent is at least any one of the two directions in which a smaller angle of angles with respect to the rolling direction is 45°.

(6) The rotor according to (5) above, in which the number of the magnetic poles of the rotor may be a multiple of four, two of the magnetic poles may be positioned at positions facing each other via an axial center in a first direction between two directions in which the magnetic characteristics of at least one of the electrical steel sheets are most excellent, two of the magnetic poles may be positioned at positions facing each other via an axial center in the second direction between two directions in which the magnetic characteristics of at least one of the electrical steel sheets are most excellent, the centerlines in the circumferential direction of the two magnetic poles positioned at the positions facing each other via the axial center in the first direction may coincide with the first direction of the at least one electrical steel sheet, and the centerlines in the circumferential direction of the two magnetic poles positioned at the positions facing each other via the axial center in the second direction may coincide with the second direction of the at least one electrical steel sheet.

(7) The rotor according to (6) above, in which the number of the magnetic poles of the rotor may be four, the centerlines in the circumferential direction of the two magnetic poles positioned at the positions facing each other via the axial center in the first direction may coincide with the first direction of the plurality of electrical steel sheets, and the centerlines in the circumferential direction of the two magnetic poles positioned at the positions facing each other via the axial center in the second direction may coincide with the second direction of the plurality of electrical steel sheets.

(8) The rotor according to any one of (5) to (7) above, in which the plurality of electrical steel sheets may be laminated in a state in which orientations of two directions in which the magnetic characteristics are most excellent deviate from each other.

(9) The rotor according to any one of (5) to (8) above, in which the plurality of electrical steel sheets may be laminated in a state in which orientations of two directions in which the magnetic characteristics are most excellent periodically deviate from each other in a lamination direction of the electrical steel sheets.

(10) The rotor according to any one of (5) to (9) above, in which, in all of the magnetic poles whose centerline in the circumferential direction coincides with the direction in which the magnetic characteristics of at least one of the electrical steel sheets are most excellent, the numbers of the electrical steel sheets in which the direction in which the magnetic characteristics of the electrical steel sheet are most excellent coincides with the centerline in the circumferential direction of the magnetic pole may be the same.

(11) The rotor according to any one of (5) to (10) above, in which, in all of the magnetic poles, at least one electrical steel sheet in which the direction in which the magnetic characteristics are most excellent coincides with the centerline in the circumferential direction of the magnetic pole is included.

(12) The rotor according to any one of (5) to (11) above, in which, in each of the plurality of electrical steel sheets, as the direction in which the magnetic characteristics are most excellent, there is at least one direction that coincides with the centerline in the circumferential direction of the magnetic pole.

(13) The rotor according to any one of (5) to (12) above, in which, in each of the plurality of electrical steel sheets, positional relationships of regions configuring each magnetic pole of the electrical steel sheet with respect to a rolling direction may be the same.

(14) A rotating electric machine of the present invention has the rotor core according to any one of (1) to (13) above, the rotating electric machine being a reluctance motor or a reluctance generator.

Effects of the Invention

According to the above-described aspects of the present invention, it is possible to improve the magnetic characteristics of rotor cores that are used in reluctance motors or reluctance generators.

Figure 1:
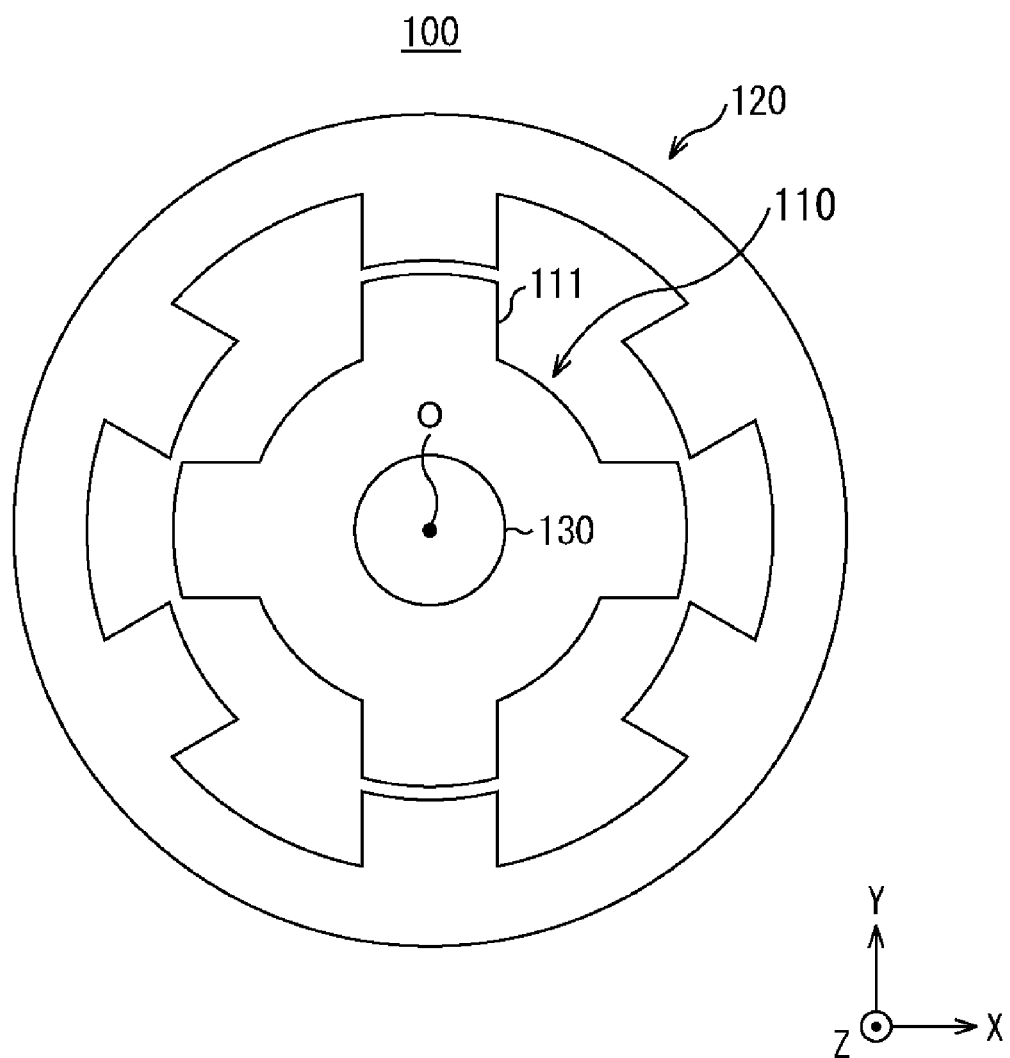
FIG. 1 is a view showing a first example of the configuration of a rotating electric machine.

EMBODIMENTS OF THE INVENTION (Electrical Steel Sheet Used for Rotor Core)

First, an electrical steel sheet that is used for a rotor core of an embodiment to be described below will be described.

First, the chemical composition of the non-oriented electrical steel sheet, which is an example of the electrical steel sheet used for the rotor core, and the steel used in the manufacturing method thereof will be described. In the following description, "%" that is the unit of the amount of each element that is contained in the non-oriented electrical steel sheet or the steel means "mass %" unless particularly otherwise described. In addition, numerical limiting ranges described below using "to" include the lower limit value and the upper limit value in the ranges. Numerical values expressed with 'more than' or 'less than' are not included in numerical ranges. The non-oriented electrical steel sheet that is an example of the electrical steel sheet that is used for the rotor core and the steel have a chemical composition in which ferrite-austenite transformation (hereinafter, α-γ transformation) can occur, C: 0.0100% or less, Si: 1.50% to 4.00%, sol. Al: 0.0001% to 1.0%, S: 0.0100% or less, N: 0.0100% or less, one or more selected from the group consisting of Mn, Ni, Co, Pt, Pb, Cu, and Au: 2.50% to 5.00% in total, Sn: 0.000% to 0.400%, Sb: 0.000% to 0.400%, P: 0.000% to 0.400%, and one or more selected from the group consisting of Mg, Ca, Sr, Ba, Ce, La, Nd, Pr, Zn, and Cd: 0.0000% to 0.0100% in total are contained, and the remainder includes Fe and impurities. Furthermore, the amounts of Mn, Ni, Co, Pt, Pb, Cu, Au, Si, and sol. Al satisfy predetermined conditions to be described below. Examples of the impurities are impurities that are contained in a raw material such as ore or a scrap or impurities that are contained during manufacturing steps.

<<C: 0.0100% or Less>>

C increases the iron loss or causes magnetic ageing. Therefore, the C content is preferably as small as possible. Such a phenomenon becomes significant when the C content exceeds 0.0100%. Therefore, the C content is set to 0.0100% or less. A reduction in the C content also contributes to uniform improvement in the magnetic characteristics in all directions in the sheet surface. The lower limit of the C content is not particularly limited, but is preferably set to 0.0005% or more based on the cost of a decarburization treatment at the time of refining.

<<Si: 1.50% to 4.00%>>

Si increases the electric resistance to decrease the eddy-current loss to reduce the iron loss or increases the yield ratio to improve blanking workability on iron cores. When the Si content is less than 1.50%, these action effects cannot be sufficiently obtained. Therefore, the Si content is set to 1.50% or more. On the other hand, when the Si content is more than 4.00%, the magnetic flux density decreases, the blanking workability deteriorates due to an excessive increase in hardness, or cold rolling becomes difficult. Therefore, the Si content is set to 4.00% or less.

<<sol. Al: 0.0001% to 1.0%>>

Sol. Al increases the electric resistance to decrease the eddy-current loss to reduce the iron loss. Sol. Al also contributes to improvement in the relative magnitude of a magnetic flux density B50 with respect to the saturated magnetic flux density. Here, the magnetic flux density B50 refers to a magnetic flux density when the tooth is excited with a magnetic field strength of 5000 A/m. When the sol. Al content is less than 0.0001%, these action effects cannot be sufficiently obtained. In addition, Al also has a desulfurization-accelerating effect in steelmaking. Therefore, the sol. Al content is set to 0.0001% or more. On the other hand, when the sol. Al content is more than 1.0%, the magnetic flux density decreases or the yield ratio is decreased to degrade the blanking workability. Therefore, the sol. Al content is set to 1.0% or less.

<<S: 0.0100% or Less>>

S is not an essential element and is contained in steel, for example, as an impurity. S causes the precipitation of fine MnS and thereby impairs recrystallization and the growth of crystal grains in annealing. Therefore, the S content is preferably as small as possible. An increase in the iron loss and a decrease in the magnetic flux density resulting from such impairing of recrystallization and crystal grain growth become significant when the S content is more than 0.0100%. Therefore, the S content is set to 0.0100% or less. The lower limit of the S content is not particularly limited, but is preferably set to 0.0003% or more based on the cost of a desulfurization treatment at the time of refining.

<<N: 0.0100% or Less>>

Similar to C, N degrades the magnetic characteristics, and thus the N content is preferably as small as possible. Therefore, the N content is set to 0.0100% or less. The lower limit of the N content is not particularly limited, but is preferably set to 0.0010% or more based on the cost of a denitrification treatment at the time of refining.

<<One or More Selected from the Group Consisting of Mn, Ni, Co, Pt, Pb, Cu, and Au: 2.50% to 5.00% in Total>>

Since these elements are necessary elements for causing a-y transformation, these elements need to be contained in total of 2.50% or more. On the other hand, when the total exceeds 5.00%, there is a case where the cost increases and the magnetic flux density decreases. Therefore, the total of these elements is set to 5.00% or less.

In addition, as a condition for enabling the occurrence of the a-y transformation, the chemical composition is made to further satisfy the following condition. That is, when the Mn content (mass %) is indicated by (Mn), the Ni content (mass %) is indicated by (Ni), the Co content (mass %) is indicated by (Co), the Pt content (mass %) is indicated by (Pt), the Pb content (mass %) is indicated by (Pb), the Cu content (mass %) is indicated by (Cu), the Au content (mass %) is indicated by (Au), the Si content (mass %) is indicated by (Si), and the sol. Al content (mass %) is indicated by (sol. Al), by mass %, Formula (1) below is preferably satisfied.

$$((Mn)+(Ni)+(Co)+(Pt)+(Pb)+(Cu)+(Au))-((Si)+(sol. Al))>0\% \quad (1)$$

In a case where Formula (1) is not satisfied, since α-γ transformation does not occur, the magnetic flux density decreases.

<<Sn: 0.000% to 0.400%, Sb: 0.000% to 0.400%, and P: 0.000% to 0.400%>>

Sn or Sb improves the texture after cold rolling or recrystallization to improve the magnetic flux density. Therefore, these elements may be contained as necessary; however, when excessively contained, steel becomes brittle. Therefore, the Sn content and the Sb content are both set to 0.400% or less. In addition, P may be contained to ensure the hardness of the steel sheet after recrystallization; however, when excessively contained, the embrittlement of steel is caused. Therefore, the P content is set to 0.400% or less. In the case of imparting an additional effect on the magnetic characteristics or the like as described above, one or more selected from the group consisting of 0.020% to 0.400% of Sn, 0.020% to 0.400% of Sb, and 0.020% to 0.400% of P is preferably contained.

<<One or More Selected from the Group Consisting of Mg, Ca, Sr, Ba, Ce, La, Nd, Pr, Zn, and Cd: 0.0000% to 0.0100% in Total>>

Mg, Ca, Sr, Ba, Ce, La, Nd, Pr, Zn, and Cd react with S in molten steel during the casting of the molten steel to generate the precipitate of a sulfide, an oxysulfide, or both. Hereinafter, Mg, Ca, Sr, Ba, Ce, La, Nd, Pr, Zn, and Cd will be collectively referred to as "coarse precipitate forming element" in some cases. The grain sizes in the precipitate of the coarse precipitate forming element are approximately 1 µm to 2 µm, which is significantly larger than the grain sizes (approximately 100 nm) in the fine precipitates of MnS, TiN, AlN, or the like. Therefore, these fine precipitates adhere to the precipitate of the coarse precipitate forming element and are less likely to impair recrystallization and the growth of crystal grains in annealing such as process annealing. In order to sufficiently obtain this action effect, the total of these elements is preferably 0.0005% or more. However, when the total of these elements exceeds 0.0100%, the total amount of the sulfide, the oxysulfide, or both becomes excessive, and recrystallization and the growth of crystal grains in process annealing are impaired. Therefore, the amount of the coarse precipitate forming element is set to 0.0100% or less in total.

<<Texture>>

Next, the texture of a non-oriented electrical steel sheet that is an example of the electrical steel sheet that is used for the rotor core will be described. The details of a manufacturing method will be described below, but the non-oriented electrical steel sheet that is an example of the electrical steel sheet that is used for the rotor core is a chemical composition in which a-y transformation can occur and becomes a structure in which {100} crystal grains have grown by the refinement of the structure by rapid cooling immediately after finish rolling in hot rolling. Therefore, in the non-oriented electrical steel sheet that is an example of the electrical steel sheet that is used for the rotor core, the intensity in a {100}<011> orientation becomes 5 to 30, and the magnetic flux density B50 in a 45° direction with respect to a rolling direction becomes particularly high. As described above, the magnetic flux density becomes high in a specific direction, but a high magnetic flux density can be obtained in all directions on average as a whole. When the intensity in the {100}<011> orientation becomes less than 5, the intensity in a {111}<112> orientation, which decreases the magnetic flux density, becomes high, and the magnetic flux density decreases as a whole. In addition, in a manufacturing method in which the intensity in the {100}<011> orientation exceeds 30, it is necessary to thicken a hot-rolled sheet, which creates a problem of the manufacturing becoming difficult.

The intensity in the {100}<011> orientation can be measured by an X-ray diffraction method or an electron backscatter diffraction (EBSD) method. Since the reflection angles or the like of X-rays and electron beams from samples differ depending on crystal orientations, crystal orientation strengths can be obtained from the reflection strength or the like based on a random orientation sample. The intensity in the {100}<011> orientation of the non-oriented electrical steel sheet that is preferable as an example of the electrical steel sheet that is used for the rotor core becomes 5 to 30 in terms of the X-ray random intensity ratio. At this time, crystal orientations may be measured by EBSD, and values converted to X-ray random intensity ratios may be used.

<<Thickness>>

Next, the thickness of the non-oriented electrical steel sheet that is an example of the electrical steel sheet that is used for the rotor core will be described. The thickness of the non-oriented electrical steel sheet that is an example of the electrical steel sheet that is used for the rotor core is 0.50 mm or less. When the thickness exceeds 0.50 mm, it is not possible to obtain an excellent high-frequency iron loss. Therefore, the thickness is set to 0.50 mm or less.

<<Magnetic Characteristics>>

Next, the magnetic characteristics of the non-oriented electrical steel sheet that is an example of the electrical steel sheet that is used for the rotor core will be described. At the time of investigating the magnetic characteristics, the value of B50, which is the magnetic flux density of the non-oriented electrical steel sheet that is an example of the electrical steel sheet that is used for the rotor core, is measured. In the manufactured non-oriented electrical steel sheet, one rolling direction and the other rolling direction cannot be distinguished. Therefore, in the present embodiment, the rolling direction refers to both the one rolling direction and the other rolling direction. When the value of B50 (T) in the rolling direction is indicated by B50L, the value of B50 (T) in a direction inclined by 45° from the rolling direction is indicated by B50D1, the value of B50 (T) in a direction inclined by 90° from the rolling direction is indicated by B50C, and the value of B50 (T) in a direction inclined by 135° from the rolling direction is indicated by B50D2, an anisotropy of the magnetic flux density in which B50D1 and B50D2 are the highest and B50L and B50C are the lowest is observed. (T) indicates the unit of the magnetic flux density (tesla).

Here, in the case of considering, for example, an all-direction (0° to 360°) distribution of the magnetic flux density for which the clockwise (which may be counter-clockwise) direction is regarded as a positive direction, when the rolling direction is set to 0° (one direction) and 180° (the other direction), B50D1 becomes the B50 values at 45° and 225°, and B50D2 becomes the B50 values at 135° and 315°. Similarly, B50L becomes the B50 values at 0° and 180°, and B50C becomes the B50 values at 90° and 270°. The B50 value at 45° and the B50 value at 225° strictly coincide with each other, and the B50 value at 135° and the B50 value at 315° strictly coincide with each other. However, since there is a case where it is not easy to make the magnetic characteristics the same at the time of actual manufacturing, there is a case where B50D1 and B50D2 do not strictly coincide with each other. Similarly, there is a case where the B50 value at 0° and the B50 value at 180° strictly coincide with each other, and the B50 value at 90° and the B50 value at 270° strictly coincide with each other, but B50L and B50C do not strictly coincide with each other. In the non-oriented electrical steel sheet that is an example of the electrical steel sheet that is used for the rotor core, Formula (2) and Formula (3) below are satisfied using the average value of B50D1 and B50D2 and the average value of B50L and B50C.

$$(B50D1+B50D2)/2 > 1.7T \quad (2)$$

$$(B50D1+B50D2)/2 > (B50L+B50C)/2 \quad (3)$$

When the magnetic flux density is measured as described above, the average value of B50D1 and B50D2 becomes 1.7 T or more as in Formula (2), and a high anisotropy of the magnetic flux density as in Formula (3) is confirmed.

Furthermore, in addition to satisfying Formula (1), the anisotropy of the magnetic flux density is preferably higher than in Formula (3) as shown in Formula (4) below.

$$(B50D1+B50D2)/2 > 1.1 \times (B50L+B50C)/2 \quad (4)$$

Furthermore, the anisotropy of the magnetic flux density is preferably higher as shown in Formula (5) below.

$$(B50D1+B50D2)/2 > 1.2 \times (B50L+B50C)/2 \quad (5)$$

Furthermore, the average value of B50D1 and B50D2 preferably becomes 1.8 T or more as shown in Formula (6) below.

$$(B50D1+B50D2)/2 > 1.8T \quad (6)$$

The above-described 45° is a theoretical value, and there is a case where it is not easy to match the rolling direction to 45° in actual manufacturing. Therefore, rolling directions that are not strictly matched to 45° are also regarded as the rolling direction at 45°. This is also true for the 0°, 90°, 135°, 180°, 225°, 270°, and 315°.

The magnetic flux density can be measured from 55 mm×55 mm samples cut out in directions at angles of 45°, 0°, and the like with respect to the rolling direction using a single-sheet magnetic measuring instrument.

<<Manufacturing Method>>

Next, an example of a manufacturing method for the non-oriented electrical steel sheet that is an example of the electrical steel sheet that is used for the rotor core will be described. At the time of manufacturing the non-oriented electrical steel sheet that is an example of the electrical steel sheet that is used for the rotor core, for example, hot rolling, cold rolling (first cold rolling), process annealing (first annealing), skin pass rolling (second cold rolling), finish annealing (third annealing), stress relief annealing (second annealing), and the like are performed.

First, the above-described steel is heated and hot-rolled. The steel is, for example, a slab that is manufactured by normal continuous casting. Rough rolling and finish rolling of the hot rolling are performed at temperatures in the γ range (Ar1 temperature or higher). That is, hot rolling is performed such that the finishing temperature of the finish rolling becomes the Ar1 temperature or higher, and the coiling temperature becomes higher than 250° C. and 600° C. or lower. Therefore, the steel transforms from austenite to ferrite by subsequent cooling, whereby the structure is refined. When subsequent cold rolling is performed in a state where the structure has been refined, bulging recrystallization (hereinafter, bulging) is likely to occur, and it is possible to facilitate the {100} crystal grains, which are, normally, difficult to grow.

In addition, at the time of manufacturing the non-oriented electrical steel sheet that is an example of the electrical steel sheet that is used for the rotor core, furthermore, a temperature (finishing temperature) when the steel passes through the final pass of finish rolling is set to the Ar1 temperature or higher, and the coiling temperature is set to higher than 250° C. and 600° C. or lower. The steel transforms from austenite to ferrite, whereby the crystal structure is refined. The crystal structure is refined as described above, whereby it is possible to facilitate the occurrence of bulging through the subsequent cold rolling and process annealing.

After that, the hot-rolled steel sheet is coiled and pickled without being annealed, and the hot-rolling steel sheet is cold-rolled. In the cold rolling, the rolling reduction is preferably set to 80% to 95%. At a rolling reduction of smaller than 80%, bulging is less likely to occur. At a rolling reduction of larger than 95%, it becomes easier for the {100} crystal grains to grow by subsequent bulging, but it is necessary to thicken the hot-rolled steel sheet, the coiling of the hot-rolled steel sheet becomes difficult, and operations are likely to become difficult. The rolling reduction of the cold rolling is more preferably 86% or larger. At a rolling reduction of the cold rolling of 86% or larger, bulging is more likely to occur.

When the cold rolling ends, subsequently, process annealing is performed. At the time of manufacturing the non-oriented electrical steel sheet that is an example of the electrical steel sheet that is used for the rotor core, process annealing is performed at a temperature at which the steel does not transform into austenite. That is, the temperature in the process annealing is preferably set to lower than the Ac1 temperature. When the process annealing is performed as described above, bulging occurs, and it becomes easy for the {100} crystal grains to grow. In addition, the time of the process annealing is preferably set to 5 seconds to 60 seconds.

When the process annealing ends, next, skin pass rolling is performed. When skin pass rolling and annealing are performed in a state where bulging has occurred as described above, the {100} crystal grains further grow from a portion where the bulging has occurred as a starting point. This is because the skin pass rolling makes it difficult for strains to be accumulated in the {100}<011> crystal grains and makes it easy for strains to be accumulated in the {111}<112> crystal grains, and, in the subsequent annealing, the {100}<011> crystal grains including a small number of strains intrude into the {111}<112> crystal grains using the difference in strains as a driving force. This intrusion phenomenon that is caused by the strain difference as the driving force is called strain-induced boundary migration (hereinafter, SIBM). The rolling reduction of skin pass rolling is preferably 5% to 25%. At a rolling reduction of smaller than 5%, since the strain amount is too small, SIBM does not occur in the subsequent annealing, and the {100}<011> crystal grains do not become large. On the other hand, at a rolling reduction of larger than 25%, the strain amount becomes too large, and recrystallization nucleation (hereinafter, nucleation) in which new crystal grains are formed in the {111}<112> crystal grains occurs. In this nucleation, since almost all grains that are newly formed are {111}<112> crystal grain, the magnetic characteristics become poor.

After the skin pass rolling, final annealing is performed to release strains and improve the workability. Similarly, the final annealing is also set to a temperature at which the steel does not transform into austenite, and the temperature of the final annealing is set to lower than the Ac1 temperature. When the final annealing is performed as described above, the {100}<011> crystal grains intrude the {111}<112> crystal grains, and the magnetic characteristics can be improved. In addition, at the time of the final annealing, a time taken for the temperature to reach 600° C. to the Ac1 temperature is set to 1200 seconds or shorter. When this annealing time is too short, almost all strains created by the skin pass remain, and the steel sheet warps when blanked into a complicated shape. On the other hand, when the annealing time is too long, crystal grains become too coarse, the droop surface becomes large at the time of blanking, and the blanking accuracy becomes poor.

When the finish annealing ends, the non-oriented electrical steel sheet is formed or the like in order to produce a desired steel member. In addition, in order to remove strains or the like formed by forming or the like (for example, blanking) performed on the steel member made of the non-oriented electrical steel sheet, stress relief annealing is performed on the steel member. In the present embodiment, in order to cause SIBM at lower than the Ac1 temperature and to coarsen crystal grain sizes, the temperature of the stress relief annealing is set to, for example, approximately 800° C., and the time of the stress relief annealing is set to approximately two hours. The stress relief annealing makes it possible to improve the magnetic characteristics.

In the non-oriented electrical steel sheet (steel member) that is an example of the electrical steel sheet that is used for the rotor core, the high B50 of Formula (1) and the excellent anisotropy of Formula (2) can be obtained mainly by the finish rolling that is performed at the Ar1 temperature or higher in the hot rolling step in the above-described manufacturing method. Furthermore, the rolling reduction in the skin pass rolling step is set to approximately 10%, whereby a more excellent anisotropy of Formula (4) can be obtained.

The Ai1 temperature in the present embodiment is obtained from a thermal expansion change of the steel (steel sheet) in the middle of cooling at an average cooling rate of 1° C./second. In addition, the Ac1 temperature in the present embodiment is obtained from a thermal expansion change of the steel (steel sheet) in the middle of heating at an average heating rate of 1° C./second.

The steel member made of the non-oriented electrical steel sheet that is an example of the electrical steel sheet that is used for the rotor core can be manufactured as described above.

Next, the non-oriented electrical steel sheet that is an example of the electrical steel sheet that is used for the rotor core will be specifically described while describing examples. The examples to be described below are simply examples of the non-oriented electrical steel sheet, and the non-oriented electrical steel sheet is not limited to the following examples.

First Example

Molten steel was cast, thereby producing ingots having components shown in Table 1 and Table 2 below. Here, the column "left side of formula" indicates the value of the left side of Formula (1) described above. After that, the produced ingots were hot-rolled by being heated up to 1150° C. and rolled such that the sheet thicknesses became 2.5 mm. In addition, after the end of finish rolling, the hot-rolled steel sheets were water-cooled and coiled. The temperatures (finishing temperatures) in a stage of the final pass of the finish rolling at this time were 830° C. and were all temperatures higher than the Ar1 temperature. For No. 108 where no γ-α transformation occurred, the finishing temperature was set to 850° C. In addition, regarding the coiling temperature, the hot-rolled steel sheets were coiled under the conditions shown in Table 1.

Next, the hot-rolled steel sheets were pickled to remove scales and cold-rolled in rolling reductions after the cold rolling shown in Table 1. In addition, process annealing was performed at 700° C. for 30 seconds in a non-oxidizing atmosphere. Next, rolling was performed in rolling reductions of the second cold rolling (skin pass rolling) shown in Table 1.

Next, in order to investigate the magnetic characteristics, after the second cold rolling (skin pass rolling), final annealing was performed at 800° C. for 30 seconds to produce 55 mm×55 mm samples by shearing, then, stress relief annealing was performed at 800° C. for two hours, and the magnetic flux densities B50 were measured. As the measurement samples, 55 mm×55 mm samples were collected in two directions at angles of 0° C. and 45° C. with respect to the rolling direction. In addition, these two types of samples were measured, and the magnetic flux densities B50 at 0°, 45°, 90°, and 135° with respect to the rolling direction were each regarded as B50L, B50D1, B50C, and B50D2.

TABLE 1

| | Component (wt %) | | | | | | | | | | | | Formula (1) | Hot rolling | | Cold rolling | | Second cold rolling |
| | | | | | | | | | | | | | | Coiling temperature | Sheet thickness | Rolling reduction | Sheet thickness | Rolling reduction |
| No. | C | Si | sol-Al | S | N | Mn | Ni | Co | Pt | Ph | Cu | Au | | | | | | |
|---|---|---|---|---|---|---|---|---|---|---|---|---|---|---|---|---|---|---|
| 101 | 0.0008 | 2.52 | 0.010 | 0.0017 | 0.0019 | 3.12 | — | — | — | — | — | — | 0.60 | 500 | 2.5 | 85% | 0.385 | 9% |
| 102 | 0.0006 | 2.51 | 0.013 | 0.0017 | 0.0024 | — | 3.14 | — | — | — | — | — | 0.62 | 500 | 2.5 | 85% | 0.385 | 9% |
| 103 | 0.0007 | 2.48 | 0.013 | 0.0023 | 0.0017 | — | — | 3.07 | — | — | — | — | 0.57 | 500 | 2.5 | 85% | 0.385 | 9% |
| 104 | 0.0009 | 2.48 | 0.010 | 0.0023 | 0.0017 | — | — | — | 3.06 | — | — | — | 0.58 | 500 | 2.5 | 85% | 0.385 | 9% |
| 105 | 0.0008 | 2.48 | 0.010 | 0.0017 | 0.0017 | — | — | — | — | 3.12 | — | — | 0.63 | 500 | 2.5 | 85% | 0.385 | 9% |
| 106 | 0.0007 | 2.53 | 0.009 | 0.0020 | 0.0017 | — | — | — | — | — | 3.13 | — | 0.59 | 500 | 2.5 | 85% | 0.385 | 9% |
| 107 | 0.0012 | 2.47 | 0.009 | 0.0019 | 0.0022 | — | — | — | — | — | — | 3.06 | 0.58 | 500 | 2.5 | 85% | 0.385 | 9% |
| 108 | 0.0011 | 3.23 | 0.010 | 0.0020 | 0.0021 | 3.06 | — | — | — | — | — | — | −0.18 | 500 | 2.5 | 85% | 0.385 | 9% |
| 109 | 0.0012 | 2.49 | 0.301 | 0.0023 | 0.0022 | 3.36 | — | — | — | — | — | — | 0.57 | 500 | 2.5 | 85% | 0.385 | 9% |
| 110 | 0.0008 | 2.50 | 0.006 | 0.0022 | 0.0022 | 3.09 | — | — | — | — | — | — | 0.58 | 500 | 4.0 | 90% | 0.420 | 17% |
| 111 | 0.0009 | 2.54 | 0.010 | 0.0020 | 0.0022 | 3.13 | — | — | — | — | — | — | 0.58 | 500 | 3.0 | 87% | 0.385 | 9% |
| 112 | 0.0010 | 2.49 | 0.006 | 0.0022 | 0.0019 | 3.07 | — | — | — | — | — | — | 0.58 | 500 | 2.5 | 86% | 0.355 | 1% |
| 113 | 0.0007 | 2.48 | 0.014 | 0.0020 | 0.0019 | 3.14 | — | — | — | — | — | — | 0.64 | 500 | 7.0 | 95% | 0.385 | 9% |
| 114 | 0.0009 | 2.50 | 0.014 | 0.0024 | 0.0019 | 3.12 | — | — | — | — | — | — | 0.60 | 500 | 2.5 | 89% | 0.275 | 9% |
| 115 | 0.0013 | 2.48 | 0.011 | 0.0021 | 0.0023 | 3.10 | — | — | — | — | — | — | 0.61 | 500 | 1.5 | 93% | 0.110 | 9% |
| 116 | 0.0012 | 2.49 | 0.601 | 0.0020 | 0.0021 | 3.69 | — | — | — | — | — | — | 0.60 | 700 | 2.8 | 86% | 0.385 | 9% |
| 117 | 0.0008 | 2.50 | 0.600 | 0.0020 | 0.0019 | 3.69 | — | — | — | — | — | — | 0.59 | 600 | 2.8 | 86% | 0.385 | 9% |
| 118 | 0.0012 | 2.49 | 0.600 | 0.0020 | 0.0020 | 3.71 | — | — | — | — | — | — | 0.61 | 500 | 2.8 | 86% | 0.385 | 9% |
| 119 | 0.0009 | 2.52 | 0.599 | 0.0018 | 0.0018 | — | 3.70 | — | — | — | — | — | 0.58 | 500 | 2.8 | 86% | 0.385 | 9% |
| 120 | 0.0011 | 2.47 | 0.599 | 0.0019 | 0.0021 | — | — | 3.68 | — | — | — | — | 0.61 | 500 | 2.8 | 86% | 0.385 | 9% |
| 121 | 0.0012 | 2.53 | 0.599 | 0.0019 | 0.0020 | — | — | — | 3.69 | — | — | — | 0.55 | 500 | 2.8 | 86% | 0.385 | 9% |
| 122 | 0.0008 | 2.52 | 0.599 | 0.0020 | 0.0021 | — | — | — | — | 3.73 | — | — | 0.60 | 500 | 2.8 | 86% | 0.385 | 9% |
| 123 | 0.0012 | 2.48 | 0.604 | 0.0021 | 0.0020 | — | — | — | — | — | 3.71 | — | 0.63 | 500 | 2.8 | 86% | 0.385 | 9% |
| 124 | 0.0012 | 2.48 | 0.598 | 0.0021 | 0.0019 | — | — | — | — | — | — | 3.69 | 0.61 | 500 | 2.8 | 86% | 0.385 | 9% |
| 125 | 0.0011 | 2.49 | 0.600 | 0.0020 | 0.0019 | 3.68 | — | — | — | — | — | — | 0.59 | 400 | 2.8 | 86% | 0.385 | 9% |
| 126 | 0.0012 | 2.48 | 0.600 | 0.0019 | 0.0020 | 3.70 | — | — | — | — | — | — | 0.62 | 300 | 2.8 | 86% | 0.385 | 9% |
| 127 | 0.0010 | 2.50 | 0.602 | 0.0020 | 0.0019 | 3.69 | — | — | — | — | — | — | 0.59 | 200 | 2.8 | 86% | 0.385 | 9% |
| 128 | 0.0011 | 2.52 | 0.900 | 0.0018 | 0.0021 | 4.00 | — | — | — | — | — | — | 0.58 | 500 | 2.8 | 86% | 0.385 | 9% |
| 129 | 0.0010 | 2.49 | 0.600 | 0.0020 | 0.0021 | 3.72 | — | — | — | — | — | — | 0.63 | 500 | 2.0 | 81% | 0.385 | 9% |
| 130 | 0.0011 | 2.50 | 0.598 | 0.0022 | 0.0021 | 3.72 | — | — | — | — | — | — | 0.62 | 500 | 1.8 | 79% | 0.385 | 9% |

TABLE 2

| | Characteristics of steel sheet | | B50 (T) | | | | | | | | | |
| No. | {100}<011> | Sheet thickness | B50D1 | B50D2 | B50L | B50C | Formula (2) | Formula (3) | Formula (4) | Formula (5) | Formula (6) | Note |
|---|---|---|---|---|---|---|---|---|---|---|---|---|
| 101 | 14.6 | 0.35 | 1.809 | 1.812 | 1.558 | 1.550 | Satisfied | Satisfied | Satisfied | Not satisfied | Satisfied | Present Invention |
| 102 | 14.9 | 0.35 | 1.814 | 1.809 | 1.563 | 1.553 | Satisfied | Satisfied | Satisfied | Not satisfied | Satisfied | Present Invention |
| 103 | 15.2 | 0.35 | 1.809 | 1.814 | 1.563 | 1.547 | Satisfied | Satisfied | Satisfied | Not satisfied | Satisfied | Present Invention |
| 104 | 15.1 | 0.35 | 1.807 | 1.814 | 1.564 | 1.547 | Satisfied | Satisfied | Satisfied | Not satisfied | Satisfied | Present Invention |
| 105 | 15.3 | 0.35 | 1.813 | 1.807 | 1.558 | 1.548 | Satisfied | Satisfied | Satisfied | Not satisfied | Satisfied | Present Invention |
| 106 | 14.8 | 0.35 | 1.814 | 1.808 | 1.556 | 1.547 | Satisfied | Satisfied | Satisfied | Not satisfied | Satisfied | Present Invention |
| 107 | 14.6 | 0.35 | 1.807 | 1.807 | 1.559 | 1.547 | Satisfied | Satisfied | Satisfied | Not satisfied | Satisfied | Present Invention |

TABLE 2-continued

| | Characteristics of steel sheet | | | | | | B50 (T) | | | | | |
|---|---|---|---|---|---|---|---|---|---|---|---|---|
| No. | {100}<011> | Sheet thickness | B50D1 | B50D2 | B50L | B50C | Formula (2) | Formula (3) | Formula (4) | Formula (5) | Formula (6) | Note |
| 108 | 0.3 | 0.35 | 1.548 | 1.551 | 1.633 | 1.583 | Not satisfied | Not satisfied | Not satisfied | Not satisfied | Not satisfied | Comparative Example |
| 109 | 15.4 | 0.35 | 1.792 | 1.787 | 1.548 | 1.554 | Satisfied | Satisfied | Satisfied | Not satisfied | Not satisfied | Present Invention |
| 110 | 25.1 | 0.35 | 1.846 | 1.851 | 1.538 | 1.532 | Satisfied | Satisfied | Satisfied | Satisfied | Satisfied | Present Invention |
| 111 | 19.8 | 0.35 | 1.818 | 1.817 | 1.547 | 1.540 | Satisfied | Satisfied | Satisfied | Not satisfied | Satisfied | Present Invention |
| 112 | 3.1 | 0.35 | 1.684 | 1.678 | 1.586 | 1.587 | Not satisfied | Satisfied | Not satisfied | Not satisfied | Not satisfied | Comparative Example |
| 113 | 34.6 | 0.35 | 1.861 | 1.862 | 1.551 | 1.551 | Satisfied | Satisfied | Satisfied | Not satisfied | Satisfied | Comparative Example |
| 114 | 20.0 | 0.25 | 1.812 | 1.813 | 1.541 | 1.526 | Satisfied | Satisfied | Satisfied | Not satisfied | Satisfied | Present Invention |
| 115 | 19.7 | 0.10 | 1.839 | 1.843 | 1.586 | 1.590 | Satisfied | Satisfied | Satisfied | Not satisfied | Satisfied | Present Invention |
| 116 | 7.0 | 0.35 | 1.727 | 1.730 | 1.528 | 1.529 | Satisfied | Satisfied | Satisfied | Not satisfied | Not satisfied | Present Invention |
| 117 | 12.0 | 0.35 | 1.773 | 1.767 | 1.538 | 1.532 | Satisfied | Satisfied | Satisfied | Not satisfied | Not satisfied | Present Invention |
| 118 | 15.0 | 0.35 | 1.784 | 1.778 | 1.543 | 1.531 | Satisfied | Satisfied | Satisfied | Not satisfied | Not satisfied | Present Invention |
| 119 | 14.6 | 0.35 | 1.786 | 1.785 | 1.540 | 1.532 | Satisfied | Satisfied | Satisfied | Not satisfied | Not satisfied | Present Invention |
| 120 | 14.6 | 0.35 | 1.783 | 1.788 | 1.541 | 1.528 | Satisfied | Satisfied | Satisfied | Not satisfied | Not satisfied | Present Invention |
| 121 | 15.3 | 0.35 | 1.784 | 1.785 | 1.539 | 1.531 | Satisfied | Satisfied | Satisfied | Not satisfied | Not satisfied | Present Invention |
| 122 | 14.7 | 0.35 | 1.783 | 1.785 | 1.539 | 1.533 | Satisfied | Satisfied | Satisfied | Not satisfied | Not satisfied | Present Invention |
| 123 | 15.1 | 0.35 | 1.786 | 1.787 | 1.541 | 1.529 | Satisfied | Satisfied | Satisfied | Not satisfied | Not satisfied | Present Invention |
| 124 | 15.1 | 0.35 | 1.785 | 1.785 | 1.538 | 1.527 | Satisfied | Satisfied | Satisfied | Not satisfied | Not satisfied | Present Invention |
| 125 | 12.2 | 0.35 | 1.768 | 1.772 | 1.541 | 1.531 | Satisfied | Satisfied | Satisfied | Not satisfied | Not satisfied | Present Invention |
| 126 | 11.2 | 0.35 | 1.762 | 1.765 | 1.536 | 1.531 | Satisfied | Satisfied | Satisfied | Not satisfied | Not satisfied | Present Invention |
| 127 | 6.9 | 0.35 | 1.734 | 1.735 | 1.517 | 1.529 | Satisfied | Satisfied | Satisfied | Not satisfied | Not satisfied | Present Invention |
| 128 | 15.2 | 0.35 | 1.772 | 1.774 | 1.539 | 1.519 | Satisfied | Satisfied | Satisfied | Not satisfied | Not satisfied | Present Invention |
| 129 | 10.4 | 0.35 | 1.746 | 1.746 | 1.532 | 1.521 | Satisfied | Satisfied | Satisfied | Not satisfied | Not satisfied | Present Invention |
| 130 | 5.9 | 0.35 | 1.731 | 1.736 | 1.519 | 1.528 | Satisfied | Satisfied | Satisfied | Not satisfied | Not satisfied | Present Invention |

Underlined values in Table 1 and Table 2 indicate that the conditions deviate from the scope of the present invention. In all of No. 101 to No. 107, No. 109 to No. 111, and No. 114 to No. 130, which were invention examples, the magnetic flux densities B50 were favorable values both in the 45° direction and on the whole circumference average. However, in No. 116 and No. 127, since the coiling temperatures were outside the appropriate range, the magnetic flux densities B50 were slightly low. In No. 129 and No. 130, since the rolling reductions of the cold rolling were small, the magnetic flux densities B50 were slightly low compared with No. 118 in which the components and the coiling temperature were the same. On the other hand, in No. 108, which was a comparative example, since the Si concentration was high, the value of the left side of the formula was 0 or less, and the composition did not undergo α-γ transformation, the magnetic flux densities B50 were all low. In No. 112, which was a comparative example, since the skin pass rolling reduction was decreased, the {100}<011> strength was less than 5, and all of the magnetic flux densities B50 were low. No. 113, which was a comparative example, the {100}<011> strength became 30 or more, which deviated from the present invention. In No. 113, since the thickness of the hot-rolled sheet was 7 mm, there was a drawback of an operation difficulty.

Second Example

Molten steel was cast, thereby producing ingots having components shown in Table 3 below. After that, the produced ingots were hot-rolled by being heated up to 1150° C. and rolled such that the sheet thicknesses became 2.5 mm. In addition, after the end of finish rolling, the hot-rolled steel sheets were coiled. The finishing temperatures in a stage of the final pass of the finish rolling at this time were 830° C. and were all temperatures higher than the Ar1 temperature.

Next, the hot-rolled steel sheets were pickled to remove scales and cold-rolled until the sheet thicknesses became 0.385 mm. In addition, process annealing was performed in a non-oxidizing atmosphere, and the temperatures in the process annealing were controlled such that the recrystallization rates became 85%. Next, a second cold rolling (skin pass rolling) was performed until the sheet thicknesses became 0.35 mm.

Next, in order to investigate the magnetic characteristics, after the second cold rolling (skin pass rolling), final annealing was performed at 800° C. for 30 seconds to produce 55 mm×55 mm samples by shearing, then, stress relief annealing was performed at 800° C. for two hours, and the magnetic flux densities B50 and the iron losses W10/400 were measured. The magnetic flux densities B50 were measured in the same order as in the first example. Incidentally, the iron loss W10/400 was measured as an energy loss (W/kg) that was caused in a sample when an alternating-current magnetic field of 400 Hz was applied such that the maximum magnetic flux density became 1.0 T. As the iron loss, the average value of the results measured at 0°, 45°, 90°, and 135° with respect to the rolling direction was employed.

TABLE 3

| | Component (wt %) | | | | | | | | | | | |
|---|---|---|---|---|---|---|---|---|---|---|---|---|
| No. | C | Si | Sol-Al | S | N | Mn | Sn | Sb | P | Mg | Ca | Sr |
| 201 | 0.001 | 2.5 | 0.01 | 0.002 | 0.002 | 3.1 | — | — | — | — | — | — |
| 202 | 0.001 | 2.5 | 0.01 | 0.002 | 0.002 | 3.1 | 0.05 | — | — | — | — | — |

TABLE 3-continued

| Component (wt %) | | | | | | | | | | | | |
|---|---|---|---|---|---|---|---|---|---|---|---|---|
| 203 | 0.001 | 2.5 | 0.01 | 0.002 | 0.002 | 3.1 | — | 0.05 | — | — | — | — |
| 204 | 0.001 | 2.5 | 0.01 | 0.002 | 0.002 | 3.1 | — | — | 0.05 | — | — | — |
| 205 | 0.001 | 2.5 | 0.01 | 0.002 | 0.002 | 3.1 | — | — | — | 0.0050 | — | — |
| 206 | 0.001 | 2.5 | 0.01 | 0.002 | 0.002 | 3.1 | — | — | — | — | 0.0050 | — |
| 207 | 0.001 | 2.5 | 0.01 | 0.002 | 0.002 | 3.1 | — | — | — | — | — | 0.0050 |
| 208 | 0.001 | 2.5 | 0.01 | 0.002 | 0.002 | 3.1 | — | — | — | — | — | — |
| 209 | 0.001 | 2.5 | 0.01 | 0.002 | 0.002 | 3.1 | — | — | — | — | — | — |
| 210 | 0.001 | 2.5 | 0.01 | 0.002 | 0.002 | 3.1 | — | — | — | — | — | — |
| 211 | 0.001 | 2.5 | 0.01 | 0.002 | 0.002 | 3.1 | — | — | — | — | — | — |
| 212 | 0.001 | 2.5 | 0.01 | 0.002 | 0.002 | 3.1 | — | — | — | — | — | — |
| 213 | 0.001 | 2.5 | 0.01 | 0.002 | 0.002 | 3.1 | — | — | — | — | — | — |
| 214 | 0.001 | 2.5 | 0.01 | 0.002 | 0.002 | 3.1 | — | — | — | — | — | — |

| No. | Ba | Ce | La | Nd | Pr | Zn | Cd | Formula (1) |
|---|---|---|---|---|---|---|---|---|
| 201 | — | — | — | — | — | — | — | 0.6 |
| 202 | — | — | — | — | — | — | — | 0.6 |
| 203 | — | — | — | — | — | — | — | 0.6 |
| 204 | — | — | — | — | — | — | — | 0.6 |
| 205 | — | — | — | — | — | — | — | 0.6 |
| 206 | — | — | — | — | — | — | — | 0.6 |
| 207 | — | — | — | — | — | — | — | 0.6 |
| 208 | 0.0050 | — | — | — | — | — | — | 0.6 |
| 209 | — | 0.0050 | — | — | — | — | — | 0.6 |
| 210 | — | — | 0.0050 | — | — | — | — | 0.6 |
| 211 | — | — | — | 0.0050 | — | — | — | 0.6 |
| 212 | — | — | — | — | 0.0050 | — | — | 0.6 |
| 213 | — | — | — | — | — | 0.0050 | — | 0.6 |
| 214 | — | — | — | — | — | — | 0.0050 | 0.6 |

TABLE 4

| | Characteristics of steel sheet | | Magnetic characteristics after annealing at 800° C. for two hours | | | | | |
|---|---|---|---|---|---|---|---|---|
| No. | {100} <011> | Sheet thickness | B50D1 | B50D2 | B50L | B50C | Whole circumference average W10/400 | Note |
| 201 | 15 | 0.35 | 1.81 | 1.81 | 1.56 | 1.55 | 15.3 | Present Invention |
| 202 | 15 | 0.35 | 1.82 | 1.82 | 1.57 | 1.56 | 15.3 | Present Invention |
| 203 | 15 | 0.35 | 1.82 | 1.82 | 1.57 | 1.56 | 15.3 | Present Invention |
| 204 | 15 | 0.35 | 1.82 | 1.82 | 1.57 | 1.56 | 15.3 | Present Invention |
| 205 | 15 | 0.35 | 1.81 | 1.81 | 1.56 | 1.55 | 14.9 | Present Invention |
| 206 | 15 | 0.35 | 1.81 | 1.81 | 1.56 | 1.55 | 14.9 | Present Invention |
| 207 | 15 | 0.35 | 1.81 | 1.81 | 1.56 | 1.55 | 14.9 | Present Invention |
| 208 | 15 | 0.35 | 1.81 | 1.81 | 1.56 | 1.55 | 14.9 | Present Invention |
| 209 | 15 | 0.35 | 1.81 | 1.81 | 1.56 | 1.55 | 14.9 | Present Invention |
| 210 | 15 | 0.35 | 1.81 | 1.81 | 1.56 | 1.55 | 14.9 | Present Invention |
| 211 | 15 | 0.35 | 1.81 | 1.81 | 1.56 | 1.55 | 14.9 | Present Invention |
| 212 | 15 | 0.35 | 1.81 | 1.81 | 1.56 | 1.55 | 14.9 | Present Invention |
| 213 | 15 | 0.35 | 1.81 | 1.81 | 1.56 | 1.55 | 14.9 | Present Invention |
| 214 | 15 | 0.35 | 1.81 | 1.81 | 1.56 | 1.55 | 14.9 | Present Invention |

No. 201 to No. 214 were all invention examples and all had favorable magnetic characteristics. In particular, the magnetic flux densities B50 were higher in No. 202 to No. 204 than in No. 201, No. 205 to No. 214, and the iron losses W10/400 were lower in No. 205 to No. 214 than in No. 201 to No. 204.

The present inventors found that, in order to configure the rotor core for reluctance motors or reluctance generators so that the characteristics of such a non-oriented electrical steel sheet can be effectively utilized, it is important to configure the rotor core so as to realize both of the fact that the magnetic characteristics of the rotor core in the circumferential direction become as uniform as possible and the fact that the uniform magnetic characteristics are made as excellent as possible. The rotor core of the embodiment to be described below has been made based on such an idea.

Hereinafter, embodiments of the present invention will be described with reference to the drawings. In the following description, the direction inclined by 45° from the rolling direction and the direction inclined by 135° from the rolling direction in the description of (electrical steel sheet used for rotor core) will be collectively referred to as two directions in which the small angle of the angles with respect to the rolling direction becomes 45° as necessary. Regarding the 45°, both clockwise angles and counter-clockwise angles are expressed as positive values. In a case where the clockwise direction is expressed as a negative direction and the counter-clockwise direction is expressed as a positive direction, the two directions where, between the above-described angles formed by the rolling direction and each of the two directions, the small angle becomes 45° become two directions where, between the above-described angles formed by the rolling direction and each of the two directions, the angle with a small absolute value becomes 45° or −45°. In addition, the direction inclined by 0° from the rolling direction will be referred to as the direction in which an angle formed with the rolling direction is 0° as necessary. As described above, the direction inclined by 0° from the rolling direction and the direction in which an angle formed with the rolling direction is 0° have the same meaning. In addition, in the following description, unless particularly otherwise described, electrical steel sheets refer to the non-oriented electrical steel sheet described in the section (electrical steel sheet used for rotor core). In addition, in the following description, not only a case where lengths, directions, positions, and the like strictly coincide, but also a case where lengths, directions, positions, and the like coincide without departing from the gist of the invention (for example, within a range of an error that occurs in manufacturing steps) are included.

First Embodiment

First, a first embodiment will be described.

FIG. 1 is a view showing an example of the configuration of a rotating electric machine. In the present embodiment, a case where the rotating electric machine is a switched reluctance motor will be described as an example. The rotating electric machine may be a generator instead of a motor (electric motor). In addition, in each drawing, the X-Y-Z coordinates indicate orientation relationships in each drawing. The reference sign ● in ○ indicates a direction from the back side toward the front side of the paper surface. The reference sign x in ○ indicates a direction from the front side toward the back side of the paper surface.

FIG. 1 shows an example of a view (plan view) of the rotating electric machine as viewed from above.

In FIG. 1, the rotating electric machine 100 has a rotor 110, a stator 120, and a rotating shaft 130. Additionally, the rotating electric machine 100 has a well-known configuration that the rotating electric machine 100 has such as a case that fixes the stator 120.

The stator 120 is relatively disposed outside the rotating electric machine 100. The rotor 110 is relatively disposed inside the rotating electric machine 100 so that the outer circumferential surface of the rotor 110 faces the inner circumferential surface of the stator 120 with a gap therebetween. The rotating shaft 130 is disposed at the central part of the rotating electric machine 100 in a state where the outer circumferential surface of the rotating shaft 130 faces the inner circumferential surface of the rotor 110 and the rotating shaft 130 is directly or indirectly connected to the rotor 110. Axial centers O of the rotor 110 and the stator 120 coincide with an axial center O of the rotating shaft 130. In the following description, a direction in which the rotor 110 of the rotating electric machine 100 rotates will be referred to as the circumferential direction as necessary. The height direction (=the lamination direction of the electrical steel sheets) of the rotating electric machine 100 will be referred to as the height direction as necessary. A direction that is perpendicular to the height direction and passes through the axial center O will be referred to as the radial direction as necessary.

The stator 120 has a stator core and a coil. The stator core has a yoke extending in the circumferential direction and a plurality of teeth extending in the axial center direction from the inner circumferential side of the yoke. The plurality of teeth are provided at equal intervals in the circumferential direction. In FIG. 1, a case where there are six teeth and the stator 120 has six poles will be shown as an example. The coil is coiled around the stator core. A method for coiling the coil that is to be coiled around the stator core is concentrated coiling. The stator 120 can be realized with a well-known configuration.

Figure 2:
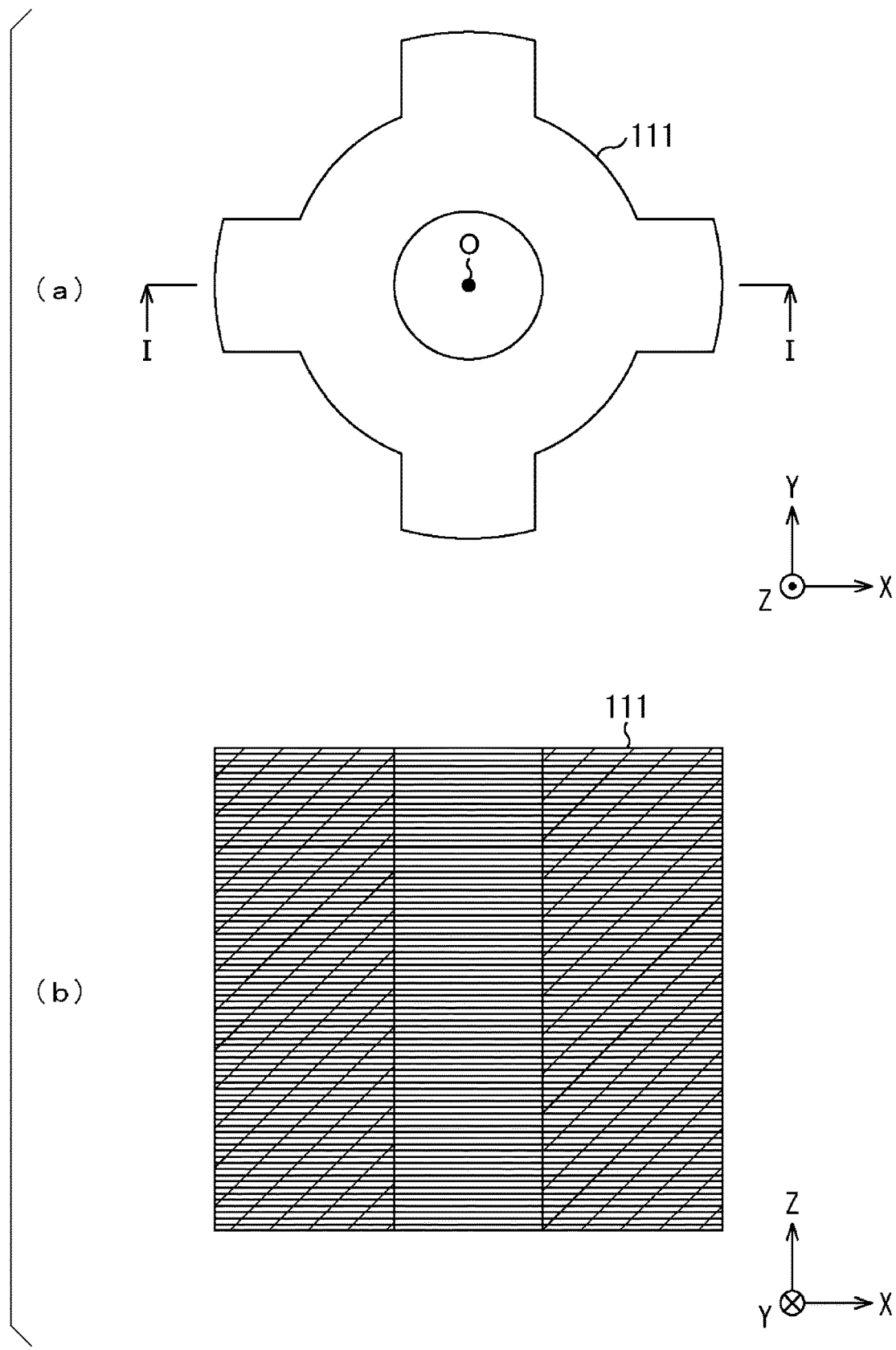
FIG. 2 is a view showing a first example of the configuration of a rotor.

FIG. 2 is a view showing an example of the configuration of the rotor 110. FIG. 2(a) shows an example of a view (plan view) of the rotor 110 as viewed from above. FIG. 2(a) shows an extracted part of the rotor 110 in FIG. 1. FIG. 2(b) is a cross-sectional view taken along the line I-I in FIG. 2(a).

The rotor 110 has a rotor core 111. The rotor core 111 is formed by laminating a plurality of electrical steel sheets blanked in a shape shown in FIG. 2(a) such that the outer edges of the plurality of electrical steel sheets are aligned as shown in FIG. 2(a) and FIG. 2(b). An insulating treatment is performed on the sheet surfaces of the plurality of electrical steel sheets. The plurality of electrical steel sheets are fixed by, for example, swaging or using an adhesive. The electrical steel sheet may be processed into the shape shown in FIG. 2(a) by, for example, laser process instead of blanking. The rotor core 111 is not split in the circumferential direction.

The rotor core 111 has a yoke extending in the circumferential direction and a plurality of salient poles extending (radially) from the outer circumferential side of the yoke in a direction opposite to the axial center direction (toward the stator 120 side). The plurality of salient poles are provided at equal intervals in the circumferential direction. The plurality of salient poles serve as magnetic poles of the rotor core 111. In FIG. 2(a), there are four salient poles. As described above, in the present embodiment, a case where the rotor 110 has four poles will be described as an example.

Figure 3:
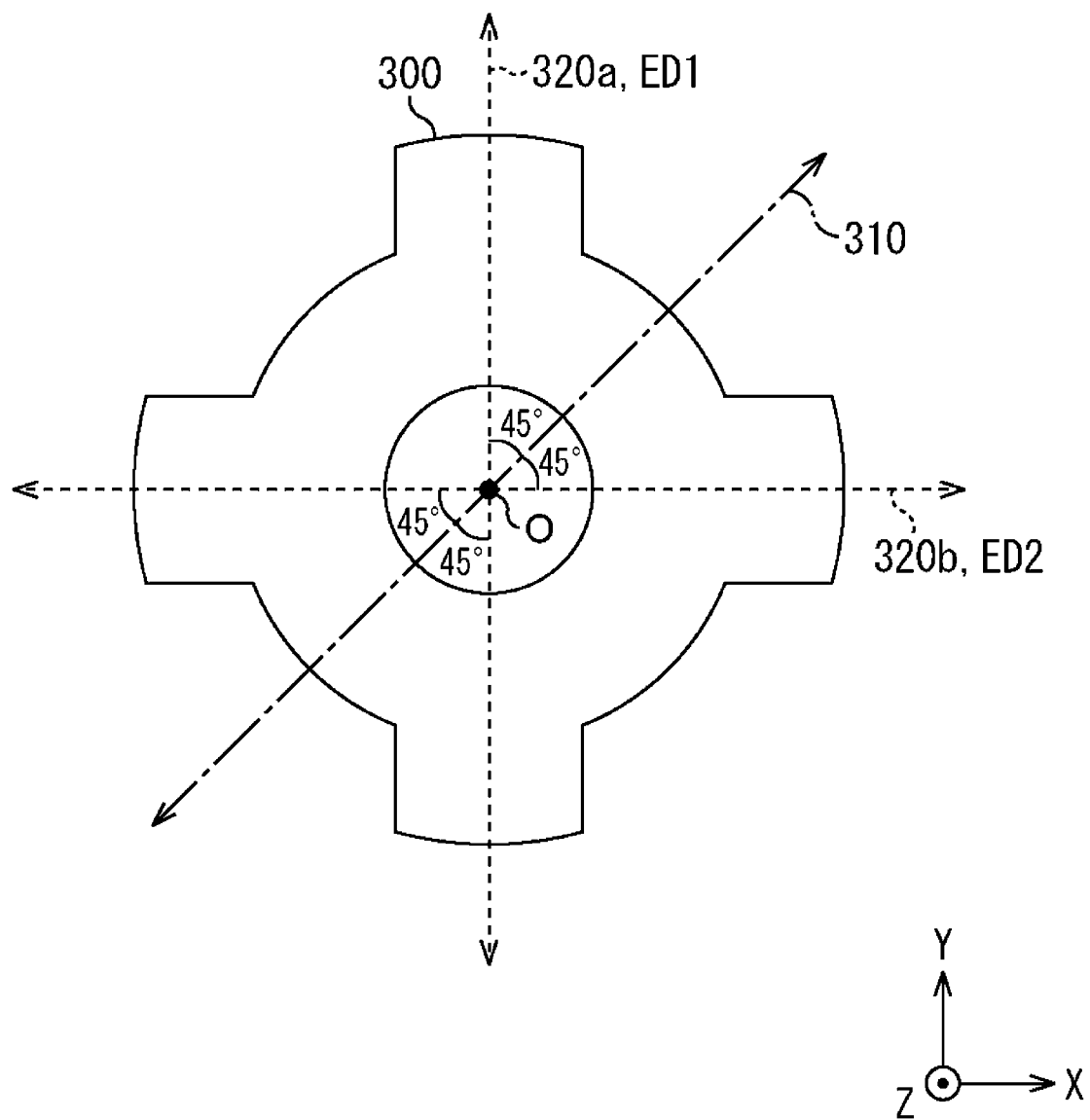
FIG. 3 is a view showing a first example of a positional relationship of an electrical steel sheet configuring a rotor core with respect to a rolling direction.

FIG. 3 is a view showing an example of the positional relationship of the electrical steel sheet configuring the rotor core 111 with respect to the rolling direction.

FIG. 3 shows one of the plurality of electrical steel sheets configuring the rotor core 111. The electrical steel sheet 300 is configured by blanking a hoop (base metal) into the shape shown in FIG. 2(a). At this time, in all of the electrical steel sheets 300 configuring the rotor core 111, the positional relationships of a region configuring each of the salient poles (four salient poles in the example shown in FIG. 2(a)) of the electrical steel sheet 300 with respect to the rolling direction are made the same.

The positional relationship of the region configuring each of the magnetic poles (salient poles) of the electrical steel sheet 300 with respect to the rolling direction is expressed with, for example, the angle formed by the rolling direction and the centerline of the region configuring each of the magnetic poles of the electrical steel sheet 300.

In FIG. 3, an imaginary line 310 indicated by an alternate long and short dash line indicates the rolling direction of the electrical steel sheet 300. Imaginary lines 320a and 320b shown by broken lines are the centerlines of the regions configuring the magnetic poles (salient poles) of the electrical steel sheet 300, and, here, a case where the centerlines coincide with directions in which the magnetic characteristics of the electrical steel sheet 300 are most excellent will be described as an example. The centerlines 320a and 320b of the regions configuring the magnetic poles of the electrical steel sheet 300 are straight lines extending in a direction parallel to the sheet surface of the electrical steel sheet 300 (a direction perpendicular to the height direction (Z-axis direction)) and are imaginary straight lines passing through the axial center O of the electrical steel sheet 300 (rotor core 111) and the centers in the circumferential direction of the regions configuring the magnetic poles. As described above, the present embodiment will be described by taking a case where all of the centerlines 320a and 320b of the regions configuring the magnetic poles of the electrical steel sheet 300 coincide with any of the directions in which the magnetic characteristics of the electrical steel sheet 300 are most excellent as an example. In the following description, the direction in which the magnetic characteristics are most excellent will be referred to as the direction of easy magnetization as necessary.

In the example shown in FIG. 3, even in the case of blanking any hoop (base metal), the angles formed by the rolling direction 310 and the centerlines 320a and 320b are made to be the same. In order for that, the blanking needs to be performed with, for example, the positional relationship of a mold with respect to the hoop (base metal) kept constant. When the hoop (base metal) is blanked as described above, a plurality of the electrical steel sheets 300 configuring the rotor core 111 are obtained. That is, the electrical steel sheets configuring the rotor core 111 are all the same as the electrical steel sheet 300 shown in FIG. 3. Therefore, in all of the electrical steel sheets 300, the centerlines 320a and 320b of the regions configuring the magnetic poles of the electrical steel sheet 300 coincide with any of two directions of easy magnetization ED1 and ED2.

As described above, two directions at an angle of 45° with respect to the rolling direction 310 are the directions of easy magnetization ED1 and ED2. As described above, angles in any direction of a direction from the X axis toward the Y axis (counter-clockwise direction on the paper surface) and a direction from the Y axis to the X axis are regarded as having a positive value. In addition, the angles of the two directions are both small angles of the angles with respect to the rolling direction.

In the example shown in FIG. 2(a), four magnetic poles (salient poles) are disposed at equal intervals in the circumferential direction. Therefore, the angle (central angle) formed by the centerlines of the two magnetic poles present at positions adjacent to each other at an interval in the circumferential direction is 90° (=360÷4). The directions of easy magnetization ED1 and ED2 are directions of easy magnetization passing through the axial center O among directions of easy magnetization present in the electrical steel sheet 300. In addition, the centerlines of the magnetic poles are centerlines of the magnetic poles in the circumferential direction, are axes extending in the radial direction, and are the same as the centerlines 320a and 320b of the regions configuring the magnetic poles of the above-described electrical steel sheet 300. In addition, the angle formed by the directions of easy magnetization ED1 and ED2 is 90°.

Therefore, when a plurality of the electrical steel sheets 300 are laminated with, for example, the directions of easy magnetization ED1 and ED2 aligned, it is possible to match any of the two directions of easy magnetization ED1 and ED2 to the centerlines of all of the magnetic poles (salient poles) of the rotor core 111 at all of the positions in the height direction where the electrical steel sheets 300 are disposed. In the present embodiment, for example, the directions of easy magnetization ED1 and ED2 correspond to a first direction and a second direction.

As described above, in the present embodiment, the magnetic characteristics of the rotor core 111 are made excellent by matching all of the directions of easy magnetization to the centerlines of the magnetic poles (salient poles) (refer to the fact that the directions of easy magnetization positioned in the regions of the magnetic poles and the centerlines of the regions are indicated by the broken lines 320a and 320b (=ED1 and ED2)). This is because the magnetic characteristics of the rotor core 111 become most excellent.

In addition, in the present embodiment, in all of the magnetic poles (salient poles) of the rotor core 111, the numbers of the electrical steel sheets 300 in which the direction of easy magnetization ED1 or ED2 coincides with the centerlines of the magnetic poles are the same. Therefore, it is possible to make the magnetic characteristics of the rotor core 111 in the circumferential direction uniform. As described above, in the present embodiment, at all of the positions in the height direction where the electrical steel sheets 300 are disposed, any of the two directions of easy magnetization ED1 and ED2 is matched to the centerlines of all of the magnetic poles of the rotor core 111. Therefore, the numbers of the electrical steel sheets 300 in which the direction of easy magnetization ED1 or ED2 coincides with the centerline of each magnetic pole is the same as the number of the electrical steel sheets 300 configuring the rotor core 111. For example, let us say that the number of the electrical steel sheets 300 configuring the rotor core 111 is 100. In this case, in all of the magnetic poles of the rotor core 111, the numbers of the electrical steel sheets 300 in which the direction of easy magnetization ED1 or ED2 coincides with the centerlines of the magnetic poles become 100 and become the same. That is, when the number of the electrical steel sheets 300 in which the directions of easy magnetization coincide with the centerlines of the magnetic poles is individually counted in each magnetic pole, the counted numbers become 100 in all of the magnetic poles and become the same.

In addition, as described in the section (electrical steel sheet used for rotor core), final annealing and stress relief annealing are performed on the rotor core 111.

[Calculation Example]

Next, a calculation example will be described.

In the present calculation example, as a rotating electric machine that is the calculation subject, a switched reluctance motor is used. The number of poles in the rotor is four, and the number of poles in the stator is six. The outer diameter of the rotor core is set to 90 mm, and the height (lamination thickness) is set to 75 mm. The outer diameter of the stator core is set to 160 mm, the inner diameter is set to 90.6 mm, and the height (lamination thickness) is set to 75 mm. It is assumed that a voltage of a direct current of 150 V is applied to each phase of the stator, and, accordingly, the rotor rotates at a rotation speed of 600 rpm.

As electrical steel sheets that are used for the rotor core as the rotating electric machine, the electrical steel sheets described in the section (electrical steel sheet used for rotor core) and well-known non-oriented electrical steel sheets are used. Both types of electrical steel sheets have a thickness of 0.25 mm. As the well-known non-oriented electrical steel sheet, a non-oriented electrical steel sheet having W10/400 of 12.8 W/kg was used. W10/400 is an iron loss when the magnetic flux density is 1.0 T and the frequency is 400 Hz. In addition, the well-known non-oriented electrical steel sheet has excellent magnetic characteristics only in the rolling direction.

The electrical steel sheets described in the section (electrical steel sheet used for rotor core) were blanked as described with reference to FIG. 2 (a).

The stator core configured by laminating the electrical steel sheets described in the section (electrical steel sheet used for rotor core) blanked as described above with the directions of easy magnetization aligned was used as a stator core that is a first analysis subject.

In addition, the well-known non-oriented electrical steel sheets were blanked as described below. That is, the well-known non-oriented electrical steel sheets were blanked such that the positional relationship of each region of the rotor core with respect to the rolling direction became the same as the positional relationship in the electrical steel sheet described in the section (electrical steel sheet used for rotor core).

The rotor core configured by laminating the well-known non-oriented electrical steel sheets blanked as described above with the rolling directions aligned was used as a stator core that is a second analysis subject.

The rotating electric machine configured using each of the rotors that were the first and second analysis subjects so as to have the above-described dimensions and shape was used as a rotating electric machine that was a calculation subject. In addition, the average torque of the rotor cores that were the first and second analysis subjects in the case of operating each rotating electric machine under the above-described conditions was derived by performing numerical value analysis (computer simulation) by the finite element method. For the numerical value analysis, finite element method electromagnetic field analysis software JMAG manufactured by JSOL Corporation was used. The results are shown in Table 5.

TABLE 5

|  | Average torque |
| --- | --- |
| Developed material | 1.010 |
| Conventional material | 1.000 |

In Table 5, a developed material shows the result of the stator core that is the first analysis subject. A conventional material shows the result of the starter core that is the second analysis subject. The values shown in Table 5 are relative values in a case where the value of the conventional material is set to 1.000.

As shown in Table 5, the average torque becomes higher by 1.0% in a case where the electrical steel sheet (developed material) described in the section (electrical steel sheet used for rotor core) is used compared with a case where a well-known non-oriented electrical steel sheet (conventional material) is used. As described above, when the electrical steel sheets described in the section (electrical steel sheet used for rotor core) are laminated, it is possible to increase the torque in the rotor core.

SUMMARY

As described above, in the present embodiment, the electrical steel sheet 300 is formed such that the centerlines of the four magnetic poles (salient poles) of the rotor core 111 coincide with the direction of easy magnetization ED1 or ED2. In addition, the electrical steel sheets 300 are laminated such that the directions of easy magnetization ED1 and ED2 are aligned. Therefore, it becomes possible to laminate the electrical steel sheets so as to realize both of the fact that the magnetic characteristics of the rotor core 111 in the circumferential direction become as uniform as possible and the fact that the uniform magnetic characteristics are made as excellent as possible. Therefore, even when the magnitudes of currents flowing through stator coils are reduced, it is possible to generate a desired torque and to reduce the copper loss of the rotating electric machine (stator).

MODIFICATION EXAMPLES

Modification Example 1

In the present embodiment, a case where the plurality of electrical steel sheets 300 are laminated with (both) the directions of easy magnetization ED1 and ED2 aligned has been described as an example. However, since the magnetic characteristics in the two directions of easy magnetization ED1 and ED2 are theoretically the same, it is not always necessary to laminate the electrical steel sheets 300 with the directions of easy magnetization ED1 and ED2 aligned as long as the rolling directions 310 are aligned. In such a case, the plurality of electrical steel sheets 300 are laminated with the direction of easy magnetization ED1 or ED2 aligned without distinguishing the directions of easy magnetization ED1 and ED2.

Modification Example 2

In the present embodiment, an inner rotor type rotating electric machine has been described as an example. However, the rotating electric machine may be an outer rotor type rotating electric machine. As described above, the rotating electric machine may be an electric motor (motor) or a generator.

Second Embodiment

Next, a second embodiment will be described. In the first embodiment, a case where the rotating electric machine is a switched reluctance motor has been described as an example. In contrast, in the present embodiment, a case where the rotating electric machine is a synchronous reluctance motor will be described as an example. As described above, the present embodiment and the first embodiment mainly differ in rotor cores to which the electrical steel sheet described in the section (electrical steel sheet used for rotor core) is applied. Therefore, in the description of the present embodiment, the same portions as in the first embodiment will be given the same reference numerals as the reference numerals in FIG. 1 to FIG. 3 and will not be described in detail.

Figure 4:
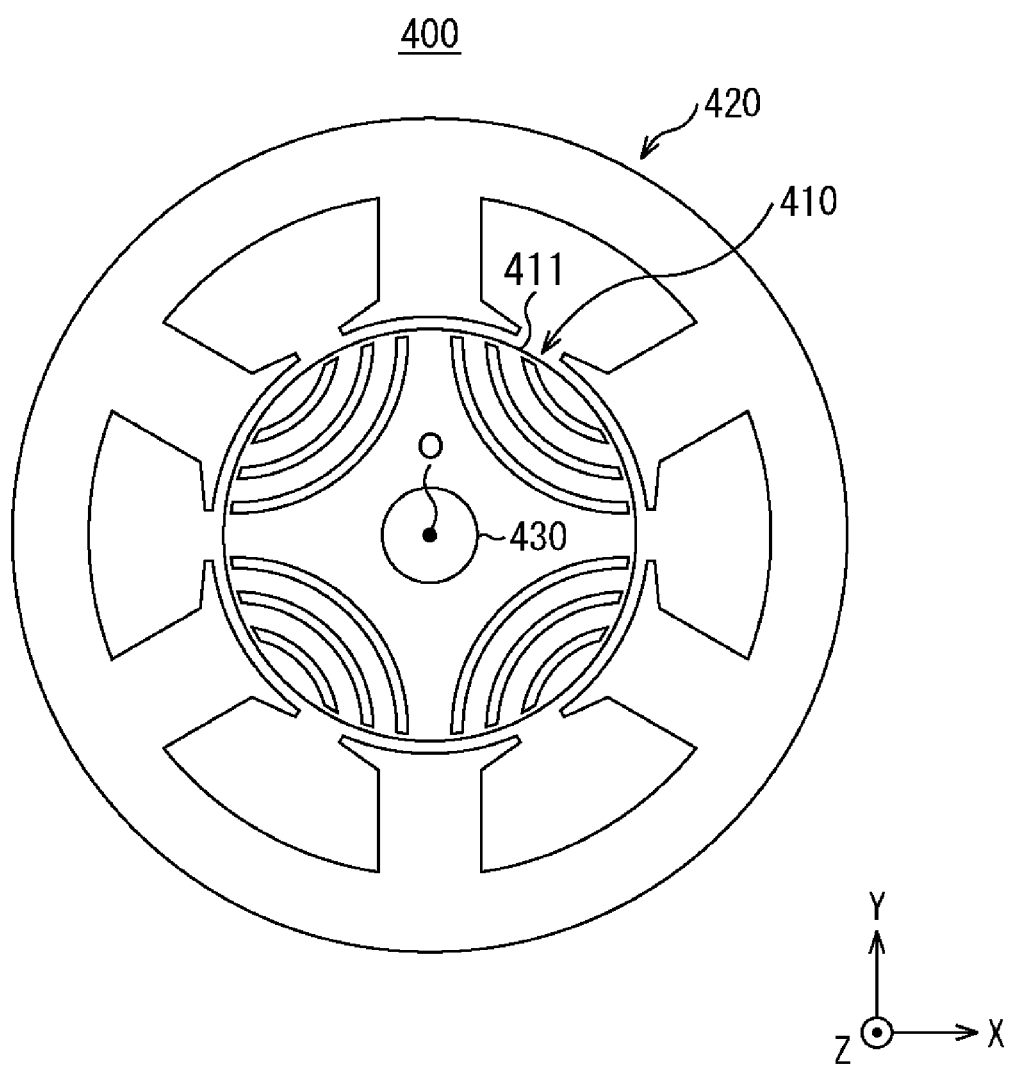
FIG. 4 is a view showing a second example of the configuration of a rotating electric machine.

FIG. 4 is a view showing an example of the configuration of the rotating electric machine. As described above, in the present embodiment, a case where the rotating electric machine is a synchronous reluctance motor will be described as an example. The rotating electric machine may be a generator instead of a motor (electric motor).

FIG. 4 shows an example of a view (plan view) of the rotating electric machine as viewed from above.

In FIG. 4, a rotating electric machine 400 has a rotor 410, a stator 420, and a rotating shaft 430. Additionally, the rotating electric machine 400 has a well-known configuration that the rotating electric machine 400 has such as a case that fixes the stator 420.

The stator 420 is relatively disposed outside the rotating electric machine 400. The rotor 410 is relatively disposed inside the rotating electric machine 400 so that the outer circumferential surface of the rotor 410 faces the inner circumferential surface of the stator 420 with a gap therebetween. The rotating shaft 430 is disposed at the central part of the rotating electric machine 400 in a state where the outer circumferential surface of the rotating shaft 430 faces the inner circumferential surface of the rotor 410 and the rotating shaft 430 is directly or indirectly connected to the rotor 410. Axial centers O of the rotor 410 and the stator 420 coincides with an axial center O of the rotating shaft 430.

The stator 420 has a stator core and a coil. The stator core has a yoke extending in the circumferential direction and a plurality of teeth extending in the axial center direction from the inner circumferential side of the yoke. The plurality of teeth are provided at equal intervals in the circumferential direction. In FIG. 4, a case where there are six teeth and the stator 420 has six poles will be shown as an example. The coil is coiled around the stator core. A method for coiling the coil that is to be coiled around the stator core is distributed coiling. The stator 420 can be realized with a well-known stator.

Figure 5:
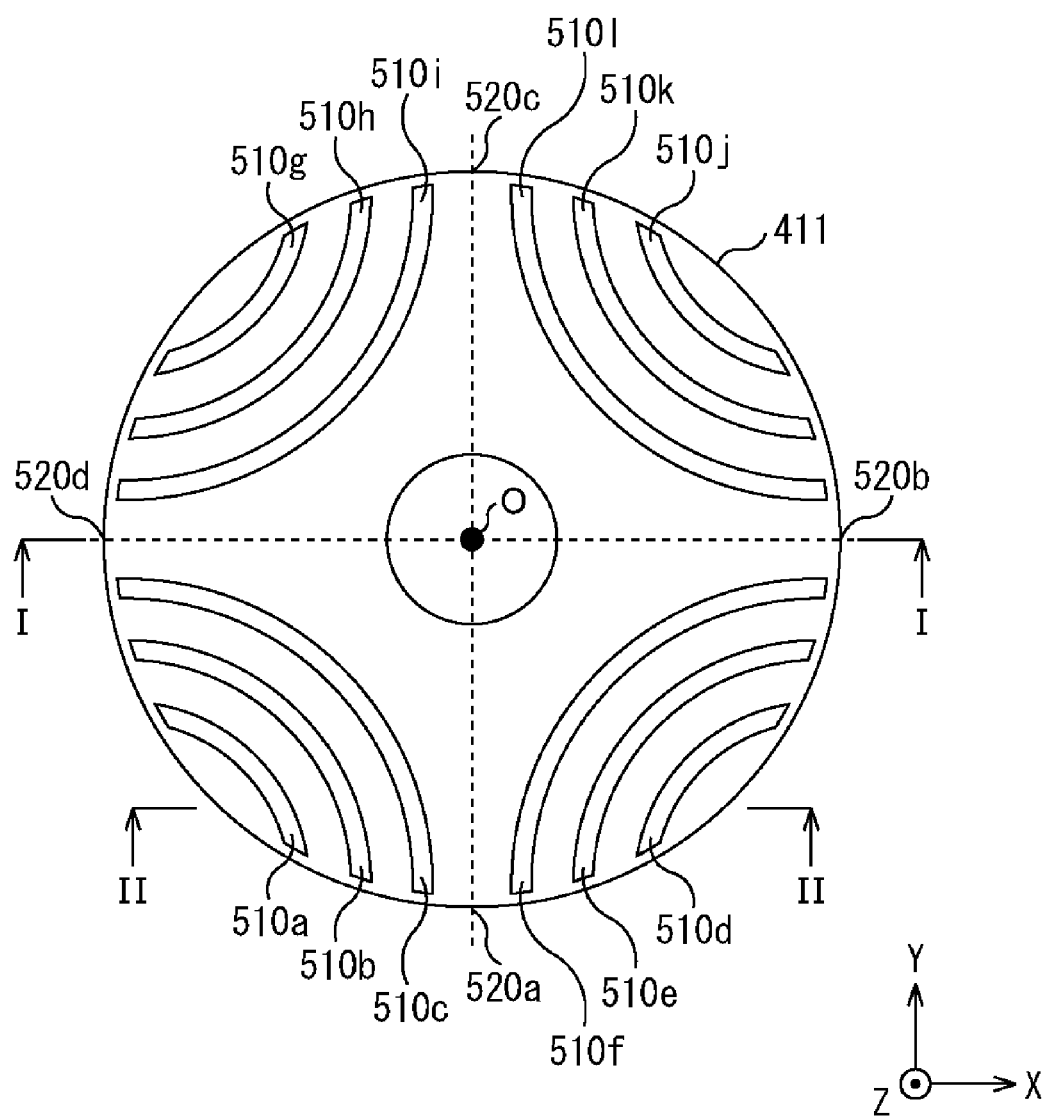
FIG. 5 is a view showing a second example of the configuration of a rotor.
Figure 6:
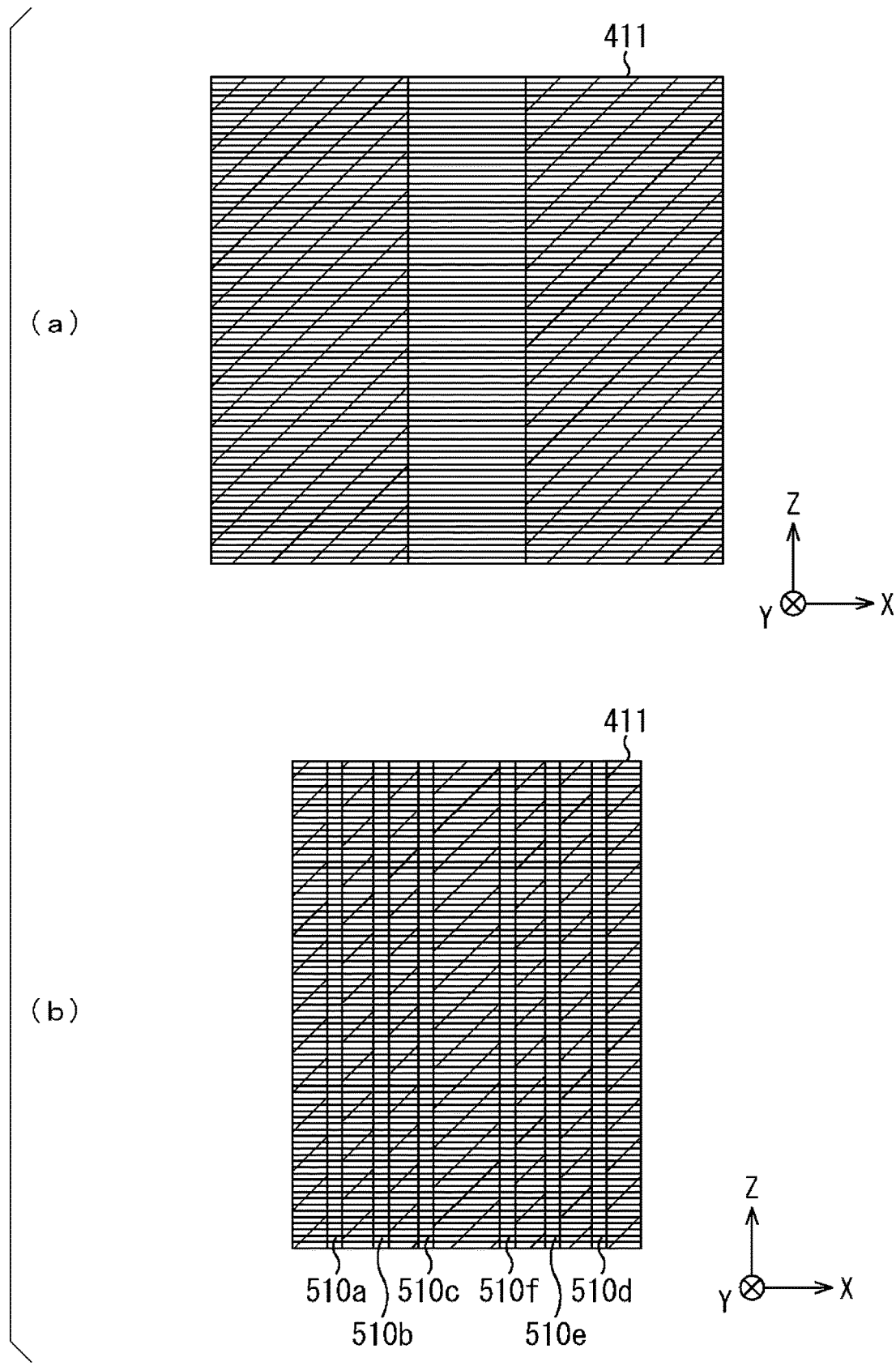
FIG. 6 is a view showing an example of a cross section of the rotor core.

FIG. 5 is a view showing an example of the configuration of the rotor 410. FIG. 5 shows an example of a view (plan view) of the rotor 410 as viewed from above. FIG. 5 shows an extracted part of the rotor 410 in FIG. 4. FIG. 6 is a view showing an example of a cross section of the rotor core. FIG. 6(a) is a cross-sectional view taken along a line I-I in FIG. 5 (a), and FIG. 6(b) is a cross-sectional view taken along a line II-II in FIG. 5(b).

The rotor 410 has a rotor core 411. The rotor core 411 is formed by laminating a plurality of electrical steel sheets blanked in a shape shown in FIG. 5 such that the outer edges and slits 510a to 510f of the plurality of electrical steel sheets are aligned as shown in FIG. 5, FIG. 6(a) and FIG. 6(b). An insulating treatment is performed on the sheet surfaces of the plurality of electrical steel sheets. The electrical steel sheet may be processed into the shape shown in FIG. 5 by, for example, laser process instead of blanking. The rotor core 411 is not split in the circumferential direction.

The rotor core 411 substantially has a shape having a plurality of the slits 510a to 510l penetrating a hollow cylindrical shape in the height direction (Z-axis direction). In the plurality of slits 510a to 510l, as described in Patent Document 2, a metal, an insulating resin, or a conductor rod may be disposed.

The slits 510a, 510d, 510g, and 510j have the same shape and size. The slits 510b, 510e, 510h, and 510k have the same shape and size. The slits 510c, 510f, 510i, and 510l have the same shape and size.

The slits 510a, 510d, 510g, and 510j are disposed at positions closer to the outer circumferential surface of the rotor core 411 than the other slits 510b, 510c, 510e, 510f, 510h, 510i, 510k, and 510l. The slits 510c, 510f, 510i, and 510l are disposed at positions closer to the axial center O of the rotor core 411 than the other slits 510a, 510b, 510d, 510e, 510g, 510h, 510j, and 510k. The slits 510b, 510e, 510h, and 510k are each disposed between the slits 510a and 510c, between the slits 510d and 510f, between the slits 510g and 510i, and between the slits 510j and 510l.

The slits 510a to 510l each have, as a planar shape, a curved shape that approaches the outer circumferential surface of the rotor core 411 in each of both ends from the center in the longitudinal direction in the case of being viewed in the height direction (Z-axis direction). The slits 510a to 510l are closest to the axial center O of the rotor core 411 at the centers in the longitudinal direction and closest to the outer circumferential surface of the rotor core 411 at both ends in the longitudinal direction.

When the slits 510a to 510c are defined as a first slit group, the slits 510d to 510f are defined as a second slit group, the slits 510g to 510i are defined as a third slit group, and the slits 510j to 510l are defined as a fourth slit group, the first slit group, the second slit group, the third slit group, and the fourth slit group are arrayed at equal pitches of 90° in the circumferential direction and are disposed so as to have a four-fold symmetric relationship with the axial center O of the rotor core 411 as the rotating shaft.

A middle position 520a in the circumferential direction between the slits 510c and 510f that is at a position of the outer circumferential surface of the rotor core 411, a middle position 520b in the circumferential direction between the slits 510f and 510l that is at a position of the outer circumferential surface of the rotor core 411, a middle position 520c in the circumferential direction between the slits 510i and 510l that is at a position of the outer circumferential surface of the rotor core 411 and a middle position 520d in the circumferential direction between the slits 510c and 510i that is at a position of the outer circumferential surface of the rotor core 411 become the central positions in the circumferential direction of the magnetic poles. In the example shown in FIG. 5, directions along lines connecting these positions 520a to 520d and the axial center O become the longitudinal directions of the magnetic poles. As described above, in the present embodiment, a case where the rotor 410 has four poles will be described as an example.

The numbers and shapes of the slits are not limited to those shown in FIG. 5, FIG. 6 (a), and FIG. 6 (b).

Figure 7:
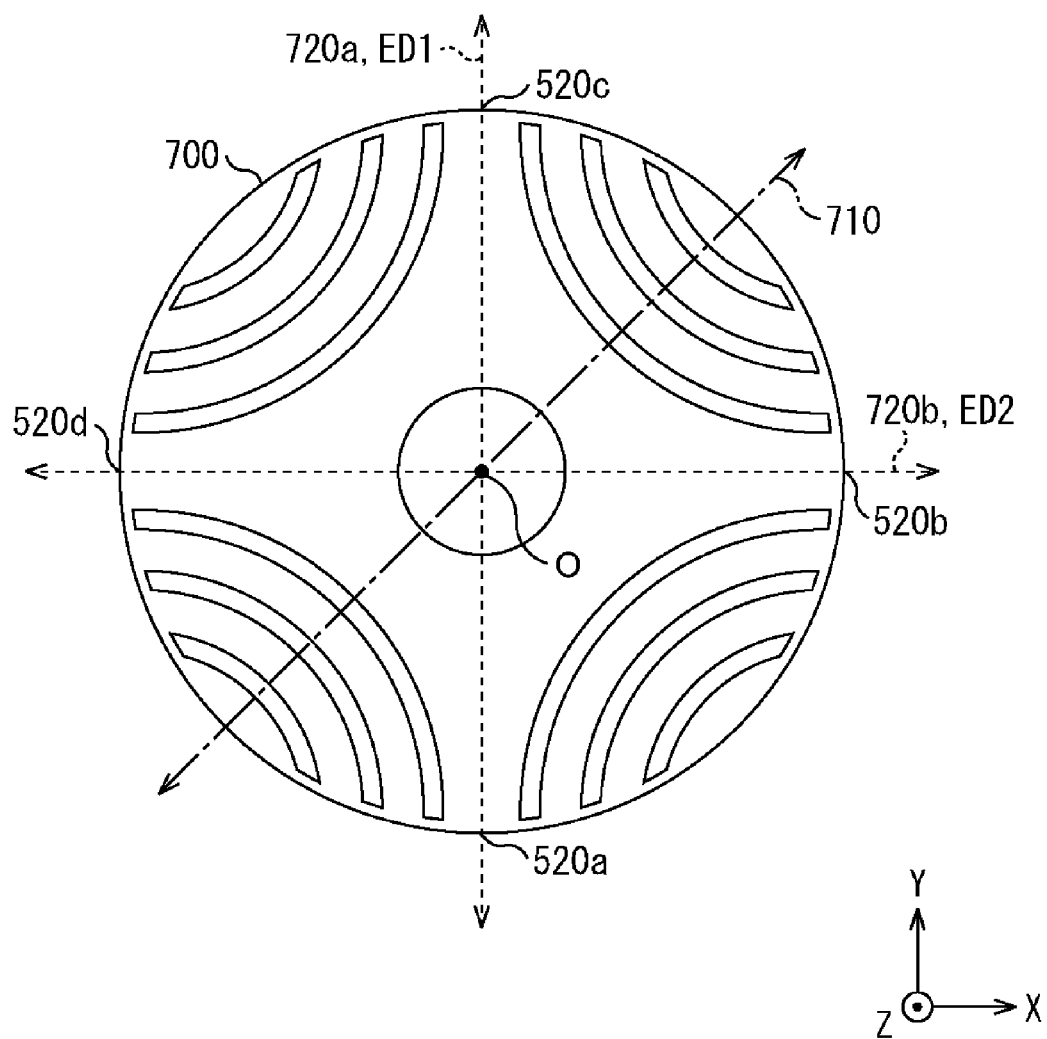
FIG. 7 is a view showing a second example of a positional relationship of an electrical steel sheet configuring a rotor core with respect to a rolling direction.

FIG. 7 is a view showing an example of the positional relationship of the electrical steel sheet configuring the rotor core 411 with respect to the rolling direction.

FIG. 7 shows one of the plurality of electrical steel sheets configuring the rotor core 411. As described above, the electrical steel sheet 700 is configured by blanking a hoop (base metal) into the shape shown in FIG. 5. At this time, in all of the electrical steel sheets 700 configuring the rotor core 411, the positional relationships of a region configuring each of (the central positions 520a to 520d in the circumferential direction of) the magnetic poles of the electrical steel sheets 700 with respect to the rolling direction are made the same.

The positional relationship of the region configuring each of the magnetic poles of the electrical steel sheet 700 with respect to the rolling direction is expressed with, for example, the angle formed by the rolling direction and the centerline of the region configuring each of the magnetic poles of the electrical steel sheet 700.

In FIG. 7, an imaginary line 710 indicated by an alternate long and short dash line indicates the rolling direction of the electrical steel sheet 700. Imaginary lines 720a and 720b shown by broken lines are the centerlines of the regions configuring the magnetic poles of the electrical steel sheet 700, and, here, a case where the centerlines coincide with directions of easy magnetization of the electrical steel sheet 700 will be described as an example. The centerlines 720a and 720b of the regions configuring the magnetic poles of the electrical steel sheet 700 are imaginary straight lines extending in a direction parallel to the sheet surface of the electrical steel sheet 700 (a direction perpendicular to the height direction (Z-axis direction)) and are imaginary straight lines passing through the axial center O of the electrical steel sheet 700 (rotor core 411) and the central positions 520a to 520d in the circumferential direction of the regions. As described above, the present embodiment will be described by taking a case where all of the centerlines 720a and 720b of the regions configuring the magnetic poles of the electrical steel sheet 700 coincide with any of the directions of easy magnetization of the electrical steel sheet 700 as an example.

In the example shown in FIG. 7, even in the case of blanking any hoop (base metal), the angles formed by the rolling direction 710 and the centerlines 720a and 720b are made to be the same. In order for that, the blanking needs to be performed with, for example, the positional relationship of a mold with respect to the hoop (base metal) kept constant. When the hoop (base metal) is blanked as described above, a plurality of the electrical steel sheets 700 configuring the rotor core 411 are obtained. That is, the electrical steel sheets configuring the rotor core 411 are all the same as the electrical steel sheet 700 shown in FIG. 7.

Therefore, in all of the electrical steel sheets 700, the centerlines 720a and 720b of the regions configuring the magnetic poles of the electrical steel sheet 700 coincide with any of two directions of easy magnetization ED1 and ED2.

As described above, two directions at an angle of 45° with respect to the rolling direction 710 are the directions of easy magnetization ED1 and ED2. As described above, angles in any direction of a direction from the X axis toward the Y axis (counter-clockwise direction on the paper surface) and a direction from the Y axis to the X axis are regarded as having a positive value. In addition, the angles of the two directions are both small angles of the angles with respect to the rolling direction.

In the example shown in FIG. 5, four magnetic poles are disposed at equal intervals in the circumferential direction. Therefore, the angle (central angle) formed by the centerlines of the two magnetic poles present at positions adjacent to each other at an interval in the circumferential direction is 90° (=360÷4). The directions of easy magnetization ED1 and ED2 are directions of easy magnetization passing through the axial center O among directions of easy magnetization present in the electrical steel sheet 700. In addition, the centerlines of the magnetic poles are centerlines of the magnetic poles in the circumferential direction, are axes extending in the radial direction, and are the same as the centerlines 720a and 720b of the regions configuring the magnetic poles of the above-described electrical steel sheet 700. In addition, the angle formed by the directions of easy magnetization ED1 and ED2 is 90°.

Therefore, when a plurality of the electrical steel sheets 700 are laminated with, for example, the directions of easy magnetization ED1 and ED2 aligned, it is possible to match any of the two directions of easy magnetization ED1 and ED2 to the centerlines of all of the magnetic poles of the rotor core 411 at all of the positions in the height direction where the electrical steel sheets 700 are disposed. In the present embodiment, for example, the directions of easy magnetization ED1 and ED2 correspond to a first direction and a second direction.

As described above, in the present embodiment as well, similar to the first embodiment, the magnetic characteristics of the rotor core 411 are made excellent by matching all of the directions of easy magnetization to the centerlines of the magnetic poles (refer to the fact that the directions of easy magnetization positioned in the regions of the magnetic poles and the centerlines of the regions are indicated by the broken lines 720a and 720b). This is because the magnetic characteristics of the rotor core 411 become most excellent.

In addition, in the present embodiment, in all of the magnetic poles of the rotor core 411, the numbers of the electrical steel sheets 700 in which the direction of easy magnetization ED1 or ED2 coincides with the centerlines of the magnetic poles are the same. Therefore, it is possible to make the magnetic characteristics of the rotor core 411 in the circumferential direction uniform. As described above, in the present embodiment, at all of the positions in the height direction where the electrical steel sheets 700 are disposed, any of the two directions of easy magnetization ED1 and ED2 is matched to the centerlines of all of the magnetic poles of the rotor core 411. Therefore, the numbers of the electrical steel sheets 700 in which the direction of easy magnetization ED1 or ED2 coincides with the centerline of each magnetic pole is the same as the number of the electrical steel sheets 700 configuring the rotor core 411. For example, let us say that the number of the electrical steel sheets 700 configuring the rotor core 411 is 100. In this case, in all of the magnetic poles of the rotor core 411, the numbers of the electrical steel sheets 700 in which the direction of easy magnetization ED1 or ED2 coincides with the centerlines of the magnetic poles become 100 and become the same.

In addition, as described in the section (electrical steel sheet used for rotor core), final annealing and stress relief annealing are performed on the rotor core 411.

SUMMARY

As described above, the electrical steel sheet described in the section (electrical steel sheet used for rotor core) can be applied to the rotor core of the synchronous reluctance motor in the same manner as the rotor core of the switched reluctance motor described in the first embodiment, and the same effect as described in the first embodiment is exhibited.

MODIFICATION EXAMPLES

The method of the rotor core is not limited to the method described in the present embodiment and can be the method of a well-known rotor core that is employed in synchronous reluctance motors.

Additionally, in the present embodiment as well, a variety of modification examples described in the first embodiment can be employed.

Third Embodiment

Next, a third embodiment will be described. In the first embodiment, a case where the magnetic poles of the rotor core 111 are four poles has been described as an example. In contrast, in the present embodiment, a case where the number of the magnetic poles of the rotor core exceeds four will be described. As described above, the present embodiment and the first embodiment mainly differ in the configuration attributed to a difference in the number of poles between the rotating electric machines. Therefore, in the description of the present embodiment, the same portions as in the first embodiment will be given the same reference numerals as the reference numerals in FIG. 1 to FIG. 3 and will not be described in detail.

Figure 8:
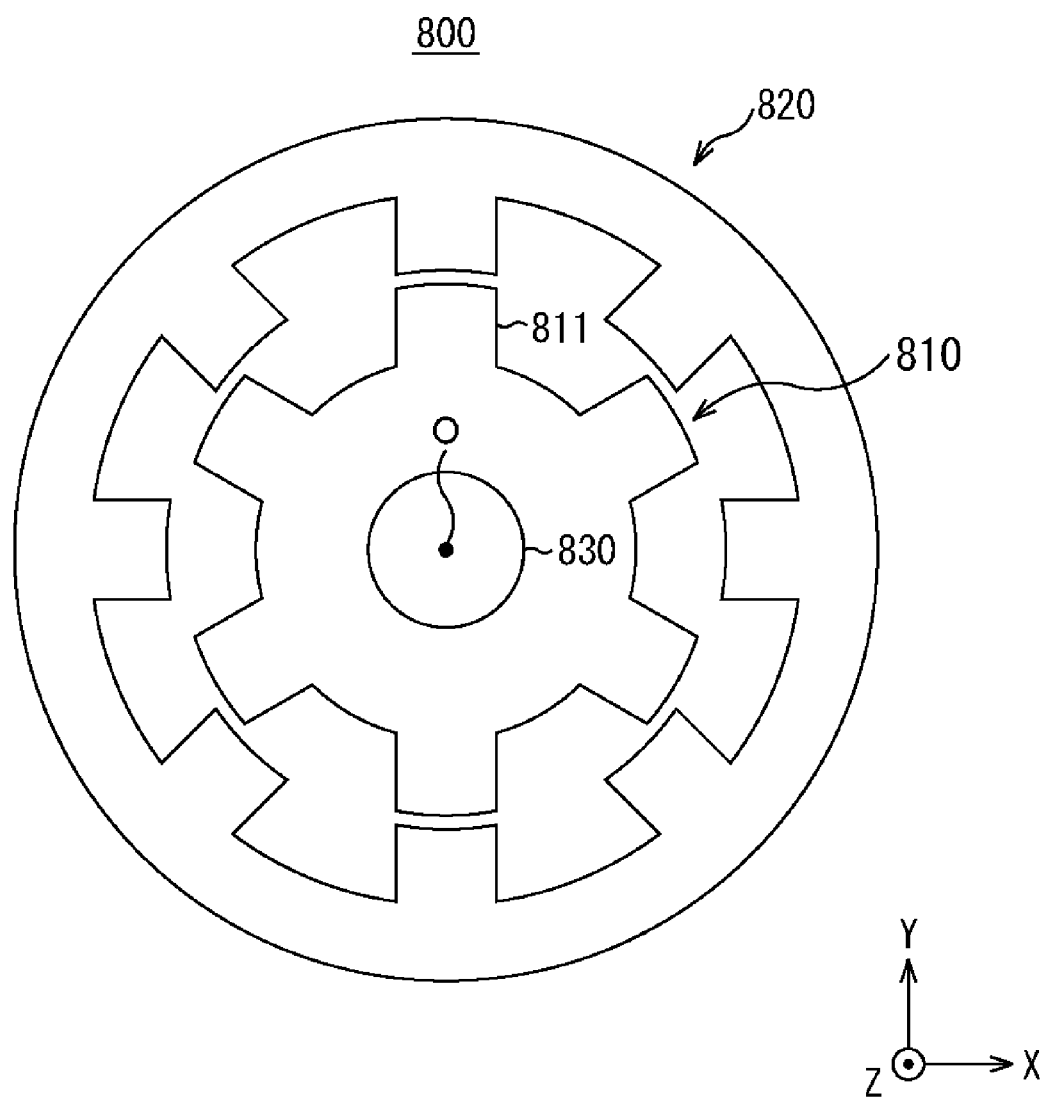
FIG. 8 is a view showing a first example of the configuration of a rotating electric machine.

FIG. 8 is a view showing an example of the configuration of the rotating electric machine. FIG. 8 shows an example of a view (plan view) of the rotating electric machine as viewed from above.

In FIG. 8, a rotating electric machine 800 has a rotor 810, a stator 820, and a rotating shaft 830. Additionally, the rotating electric machine 800 has a well-known configuration that the rotating electric machine 800 has such as a case that fixes the stator 820.

The stator 820 is relatively disposed outside the rotating electric machine 800. The rotor 810 is relatively disposed inside the rotating electric machine 800 so that the outer circumferential surface of the rotor 810 faces the inner circumferential surface of the stator 820 with a gap therebetween. The rotating shaft 830 is disposed at the central part of the rotating electric machine 800 in a state where the outer circumferential surface of the rotating shaft 830 faces the inner circumferential surface of the rotor 810 and the rotating shaft 830 is directly or indirectly connected to the rotor 810. Axial centers O of the rotor 810 and the stator 820 coincides with an axial center O of the rotating shaft 830.

The stator 820 has a stator core and a coil. The stator core has a yoke extending in the circumferential direction and a plurality of teeth extending in the axial center direction from the inner circumferential side of the yoke. The plurality of teeth are provided at equal intervals in the circumferential direction. In FIG. 8, a case where there are eight teeth and the stator 820 has eight poles will be shown as an example. The coil is coiled around the stator core. A method for coiling the coil that is to be coiled around the stator core is concentrated coiling. The stator 820 can be realized with a well-known stator.

Figure 9:
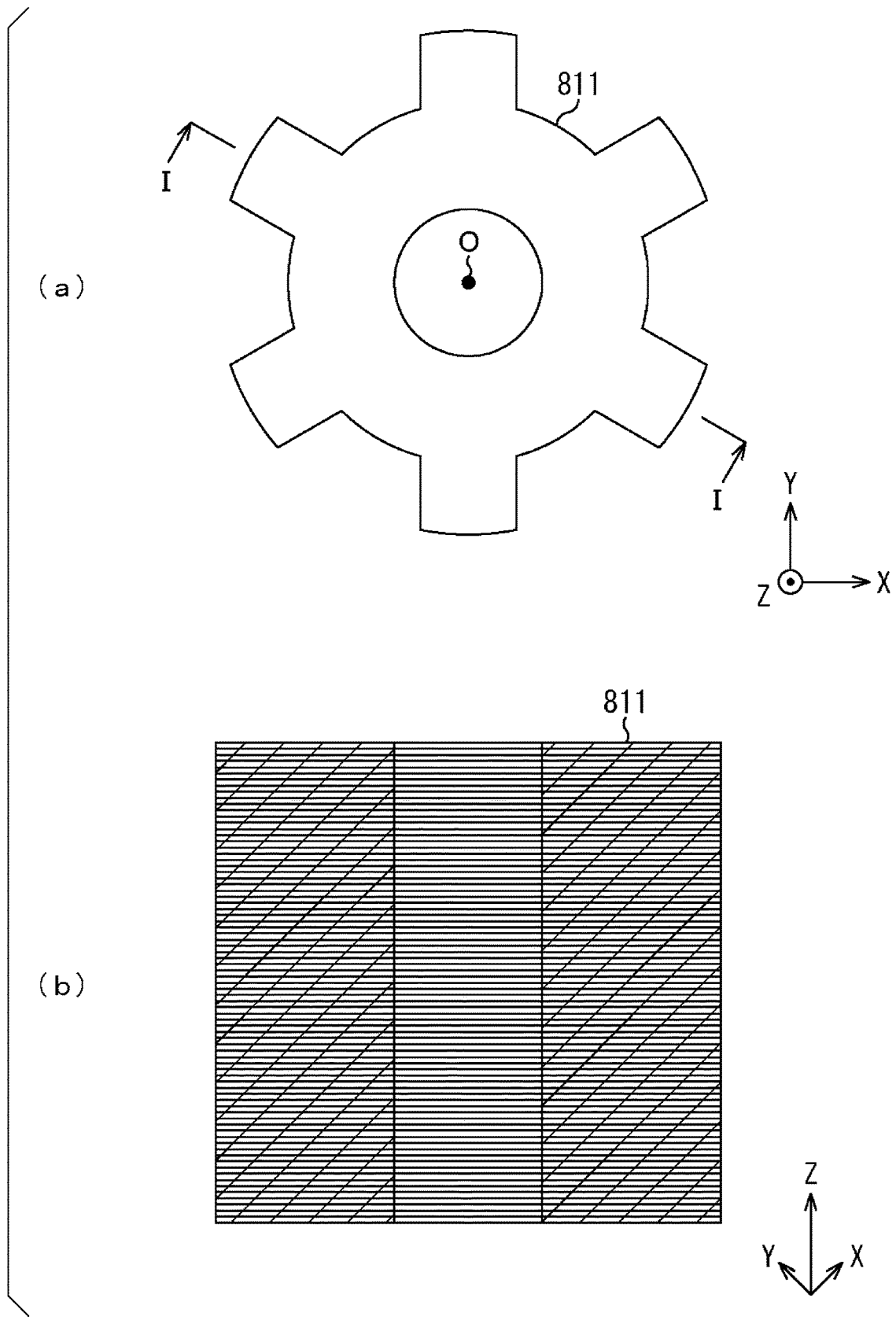
FIG. 9 is a view showing a third example of the configuration of a rotor.

FIG. 9 is a view showing an example of the configuration of the rotor 810. FIG. 9(a) shows an example of a view (plan view) of the rotor 810 as viewed from above. FIG. 9(a) shows an extracted part of the rotor 810 in FIG. 8. FIG. 9(b) is a cross-sectional view taken along the line I-I in FIG. 9(a).

The rotor 810 has a rotor core 811. The rotor core 811 is formed by laminating a plurality of electrical steel sheets blanked in a shape shown in FIG. 9(a) such that the outer edges of the plurality of electrical steel sheets are aligned as shown in FIG. 9(a) and FIG. 9(b). An insulating treatment is performed on the sheet surfaces of the plurality of electrical steel sheets. The electrical steel sheet may be processed into the shape shown in FIG. 9(a) by, for example, laser process instead of blanking. The rotor core 811 is not split in the circumferential direction.

The rotor core 811 has a yoke extending in the circumferential direction and a plurality of salient poles extending radially from the outer circumferential side of the yoke in a direction opposite to the axial center direction (toward the stator 820). The plurality of salient poles are provided at equal intervals in the circumferential direction. The plurality of salient poles serve as magnetic pole portions of the rotor core 811. In FIG. 9(a), there are six salient poles. As described above, in the present embodiment, a case where the rotor 810 has six poles will be described as an example.

Figure 10A:
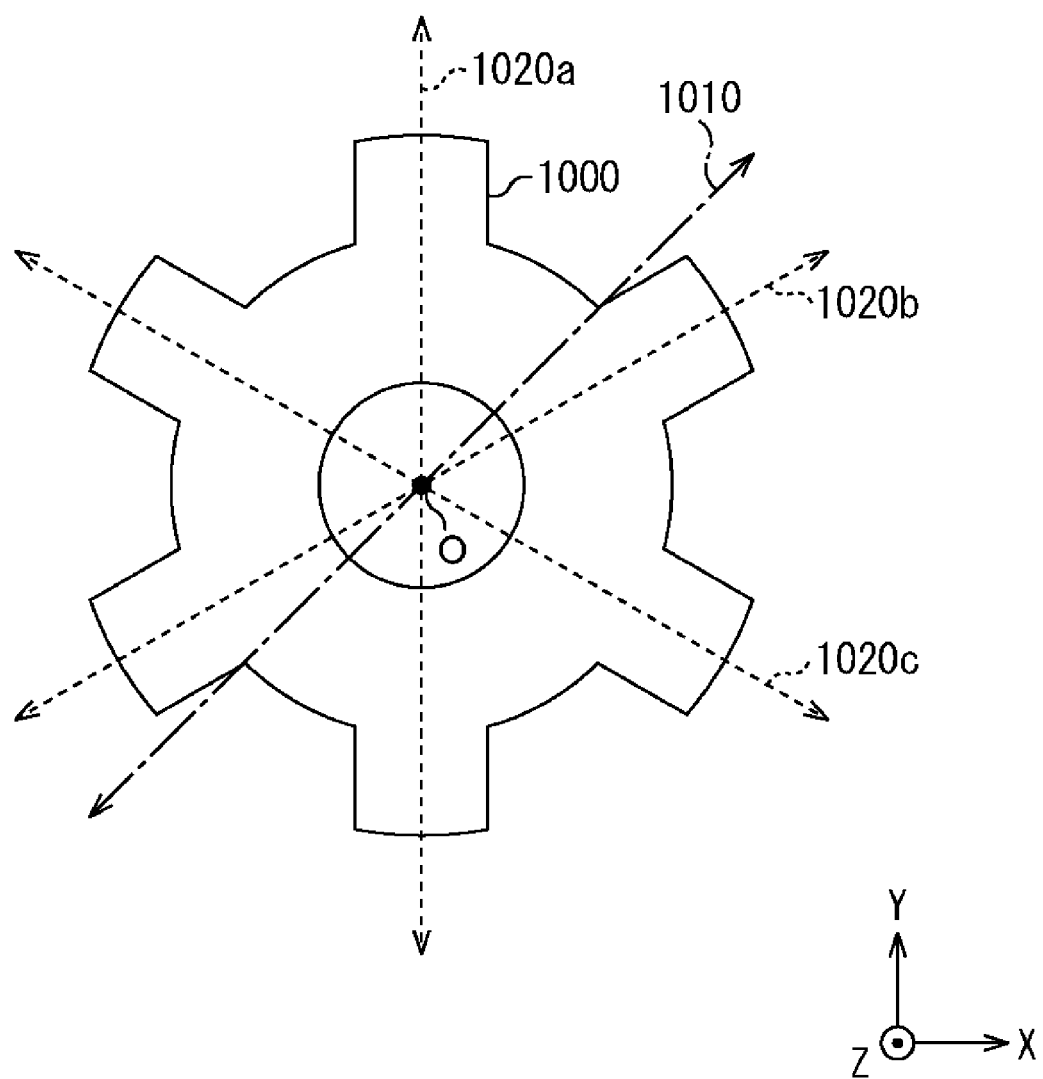
FIG. 10A is a view showing a third example of a positional relationship of an electrical steel sheet configuring a rotor core with respect to a rolling direction.

FIG. 10A is a view showing an example of the positional relationship of the electrical steel sheet configuring the rotor core 811 with respect to the rolling direction.

FIG. 10A shows one of the plurality of electrical steel sheets configuring the rotor core 811. As described above, the electrical steel sheet 1000 is configured by blanking a hoop (base metal) into the shape shown in FIG. 9(a). At this time, in all of the electrical steel sheets 1000 configuring the rotor core 811, the positional relationships of a region configuring each of the salient poles (six salient poles in the example shown in FIG. 9(a)) of the electrical steel sheet 1000 with respect to the rolling direction are made the same.

The positional relationship of the region configuring each of the magnetic poles (salient poles) of the electrical steel sheet 1000 with respect to the rolling direction is expressed with, for example, the angle formed by the rolling direction and the centerline of the region configuring each of the magnetic poles of the electrical steel sheet 1000.

In FIG. 10A, an imaginary line 1010 indicated by an alternate long and short dash line indicates the rolling direction of the electrical steel sheet 1000. Imaginary lines 1020a to 1020c shown by broken lines are the centerlines of the regions configuring the magnetic poles (salient poles) of the electrical steel sheet 1000. The centerlines 1020a to 1020c of the regions configuring the magnetic poles of the electrical steel sheet 1000 are defined as described in the first embodiment. In the first embodiment, since the magnetic poles of the rotor core 111 are poles, the number of the centerlines 320a and 320b of the regions configuring the magnetic poles of the electrical steel sheet 300 is two; however, in the present embodiment, since the magnetic poles of the rotor core 811 are six poles, the number of the centerlines 1020a to 1020c of the regions configuring the magnetic poles of the electrical steel sheet 1000 is three.

In the example shown in FIG. 10A, even in the case of blanking any hoop (base metal), the angles formed by the rolling direction 1010 and the centerlines 1020a to 1020c are made to be the same. In order for that, the blanking needs to be performed with, for example, the positional relationship of a mold with respect to the hoop (base metal) kept constant. When the hoop (base metal) is blanked as described above, a plurality of the electrical steel sheets 1000 configuring the rotor core 811 are obtained. That is, the electrical steel sheets configuring the rotor core 811 are all the same as the electrical steel sheet 1000 shown in FIG. 10A.

Figure 10B:
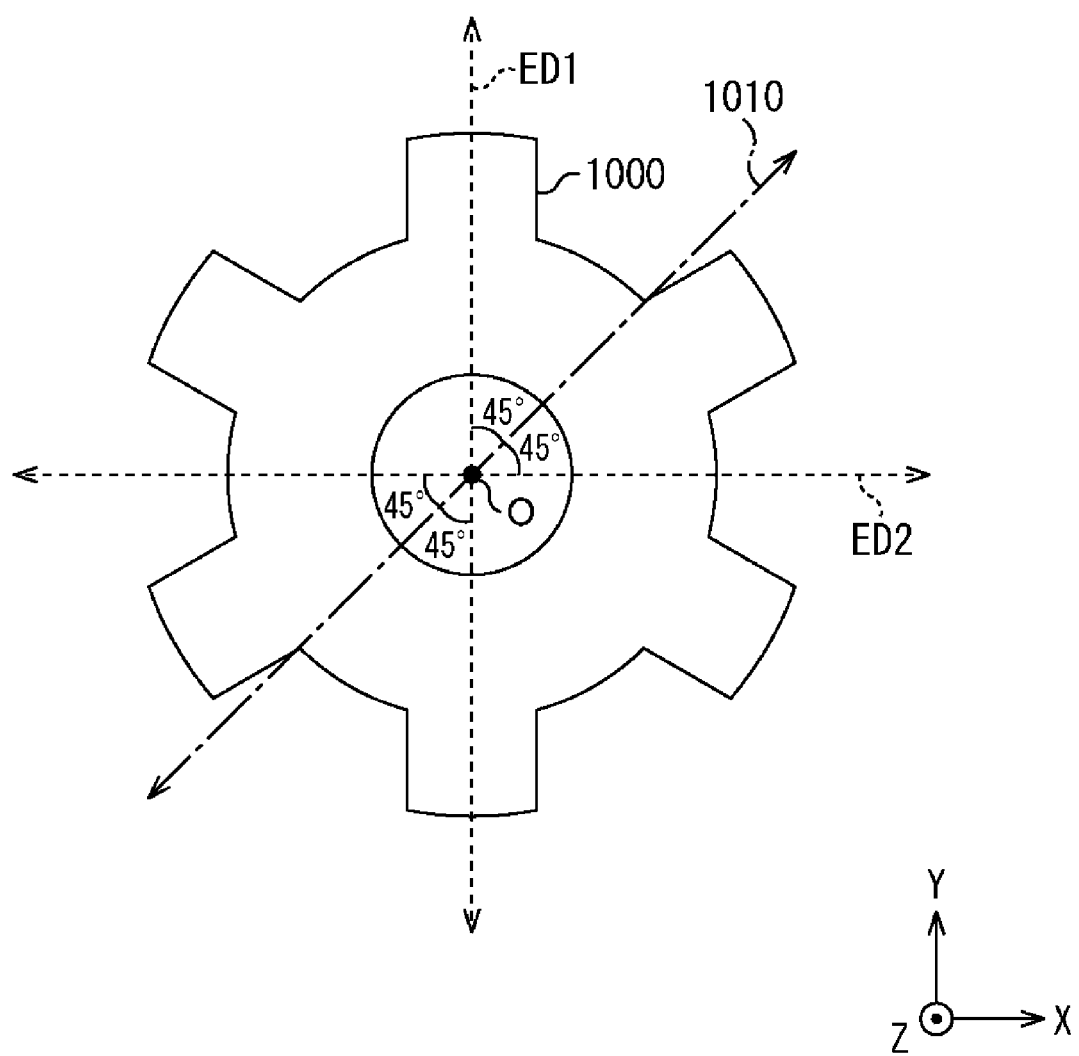
FIG. 10B is a view showing an example of a rolling direction and a direction of easy magnetization of the electrical steel sheet.

FIG. 10B is a view showing an example of a rolling direction 1010 and directions in which the magnetic characteristics are most excellent (directions of easy magnetization) of the electrical steel sheet 1000.

In FIG. 10B, broken imaginary lines ED1 and ED2 are the directions of easy magnetization of the electrical steel sheet 1000. As described above, two directions at an angle of 45° with respect to the rolling direction 1010 are the directions of easy magnetization. As described above, angles in any direction of a direction from the X axis toward the Y axis (counter-clockwise direction on the paper surface) and a direction from the Y axis to the X axis are regarded as having a positive value. In addition, the angles of the two directions are both small angles of the angles with respect to the rolling direction.

In the example shown in FIG. 10B, the directions of easy magnetization ED1 and ED2 are two directions in which the magnetic characteristics are most excellent. The directions of easy magnetization ED1 and ED2 are directions of easy magnetization passing through the axial center O among directions of easy magnetization present in the electrical steel sheet 1000. In the example shown in FIG. 8, six magnetic poles (salient poles) are disposed at equal intervals in the circumferential direction. Therefore, the angle (central angle) formed by the centerlines of the two magnetic poles present at positions adjacent to each other at an interval in the circumferential direction is 60° (=360÷6). The centerlines of the magnetic poles are the same as the centerlines 1020a to 1020c of the regions configuring the magnetic poles of the above-described electrical steel sheet 1000. Incidentally, the angle formed by the directions of easy magnetization ED1 and ED2 is 90°. Therefore, it is not possible to match the two directions of easy magnetization ED1 and ED2 to the centerlines 1020a to 1020c of the regions configuring the magnetic poles of the electrical steel sheet 1000. Therefore, between the two directions of easy magnetization ED1 and ED2, one direction of easy magnetization ED1 is matched to the centerline of a magnetic pole, and the region of the remaining direction of easy magnetization ED2 is not matched to the centerlines of any magnetic poles.

In the example shown in FIG. 10B, the magnetic poles (salient poles) are present at positions facing each other via the axial center O of the electrical steel sheet 1000 (rotor core 811). Therefore, in one electrical steel sheet 1000, the direction of easy magnetization ED1 coincides with the centerlines of two magnetic poles.

In contrast, for example, in a case where the number of magnetic poles is five, the magnetic poles are not present at positions facing each other via the axial center of the electrical steel sheet (rotor core). In such a case, the direction of easy magnetization coincides with the centerline of only one magnetic pole.

In addition, in the example shown in FIG. 10B, in one electrical steel sheet 1000, the direction of easy magnetization ED1 coincides with the centerlines of two magnetic poles. In contrast, in a case where the number of magnetic poles is a multiple of four exceeding four (for example, eight), the directions of easy magnetization ED1 and ED2 coincide with the centerlines of four magnetic poles.

As described above, in the present embodiment as well, as many directions of easy magnetization as possible are matched to the centerlines of as many magnetic poles as possible, thereby making the magnetic characteristics of the rotor core 811 as excellent as possible.

In the present embodiment, as in the first embodiment, it is not possible to match any of the two directions of easy magnetization ED1 and ED2 to the centerlines of all of the magnetic poles (salient poles) of the rotor core 811 at all of the positions in the height direction where the electrical steel sheets 1000 are disposed. Therefore, as in the first embodiment, when the electrical steel sheets 1000 are laminated with the directions of easy magnetization ED1 and ED2 aligned, the magnetic characteristics in the regions of the two magnetic poles (salient poles) whose centerlines coincide with the directions of easy magnetization ED1 and ED2 become extremely favorable compared with the magnetic characteristics in the regions of the other magnetic poles. Therefore, the magnetic characteristics of a specific rotor core 811 in the circumferential direction are significantly biased. Therefore, in order to make the magnetic characteristics of the rotor core 811 in the circumferential direction as uniform as possible, the electrical steel sheets 1000 are laminated by rotationally laminating.

The rotationally laminating means that the electrical steel sheets are laminated while each electrical steel sheet or each unit of a plurality of electrical steel sheets with a reference direction (orientation) aligned is rotated by a predetermined angle in one direction around the axial center O of the rotor core (electrical steel sheet) as a rotating shaft. The predetermined angle is normally constant, but may not be constant. By rotationally laminating, the plurality of electrical steel sheets are laminated in a state in which the orientations of the directions of easy magnetization deviate from one another.

The method for rotationally laminating the electrical steel sheets is not particularly limited as long as, in the rotor core 811, the number of magnetic poles (salient poles) whose centerline coincides with the direction of easy magnetization ED1 or ED2 of at least one electrical steel sheet 1000 is made to be larger than the number of magnetic poles (salient poles) whose centerline coincides with the direction of easy magnetization ED1 or ED2 in one electrical steel sheet 1000. In the example shown in FIG. 10B, in one electrical steel sheet 1000, the number of magnetic poles (salient poles) whose centerline coincides with the direction of easy magnetization ED1 or ED2 is two (refer to the magnetic poles (salient poles) through which the direction of easy magnetization ED1 in FIG. 10B passes). In this case, the number of magnetic poles (salient poles) whose centerline coincides with the direction of easy magnetization ED1 or ED2 of at least one electrical steel sheet 1000 needs to be three or more.

Here, in all of the magnetic poles (salient poles) of the rotor core 811, at least one electrical steel sheets 1000 in which the direction of easy magnetization ED1 or ED2 coincides with the centerlines of the magnetic poles is preferably made to be present. That is, in the case of individually counting the number of the electrical steel sheets 1000 in which the direction of easy magnetization ED1 or ED2 coincides with the centerline of any magnetic pole in each magnetic pole of the rotor core 811, the counted number is preferably made to be one or more in all of the magnetic poles. This is because it is possible to make the magnetic characteristics of the rotor core 811 in the circumferential direction uniform. In addition, in all of the magnetic poles (salient poles) whose centerline coincides with the direction of easy magnetization ED1 or ED2 of at least one electrical steel sheet 1000, the numbers of the electrical steel sheets 1000 in which the direction of easy magnetization ED1 or ED2 coincides with the centerlines of the magnetic poles are preferably the same. That is, in the case of individually counting the numbers of the electrical steel sheets 1000 in which the direction of easy magnetization ED1 or ED2 coincides with the centerline of any magnetic pole in each magnetic pole of the rotor core 811, the counted numbers are preferably made to be the same. This is because it is possible to make the magnetic characteristics of the rotor core 811 in the circumferential direction uniform. In this case, in the case of individually counting the number of the electrical steel sheets 1000 in which the direction of easy magnetization ED1 or ED2 coincides with the centerline of any magnetic pole in each magnetic pole of the rotor core 811, there may be a magnetic pole for which the counted number becomes zero. In addition, these conditions are more preferably satisfied at the same time. That is, in all of the magnetic poles (salient poles) of the rotor core 811, the numbers of the electrical steel sheets 1000 in which the direction of easy magnetization ED1 or ED2 coincides with the centerlines of the magnetic poles are more preferably made to be the same. That is, in the case of individually counting the numbers of the electrical steel sheets 1000 in which the direction of easy magnetization ED1 or ED2 coincides with the centerline of any magnetic pole in each magnetic pole of the rotor core 811, the counted numbers are preferably made to be the same number (one or more) as each other in all of the magnetic poles. This is because it is possible to make the magnetic characteristics of the rotor core 811 in the circumferential direction more uniform.

Figure 11:
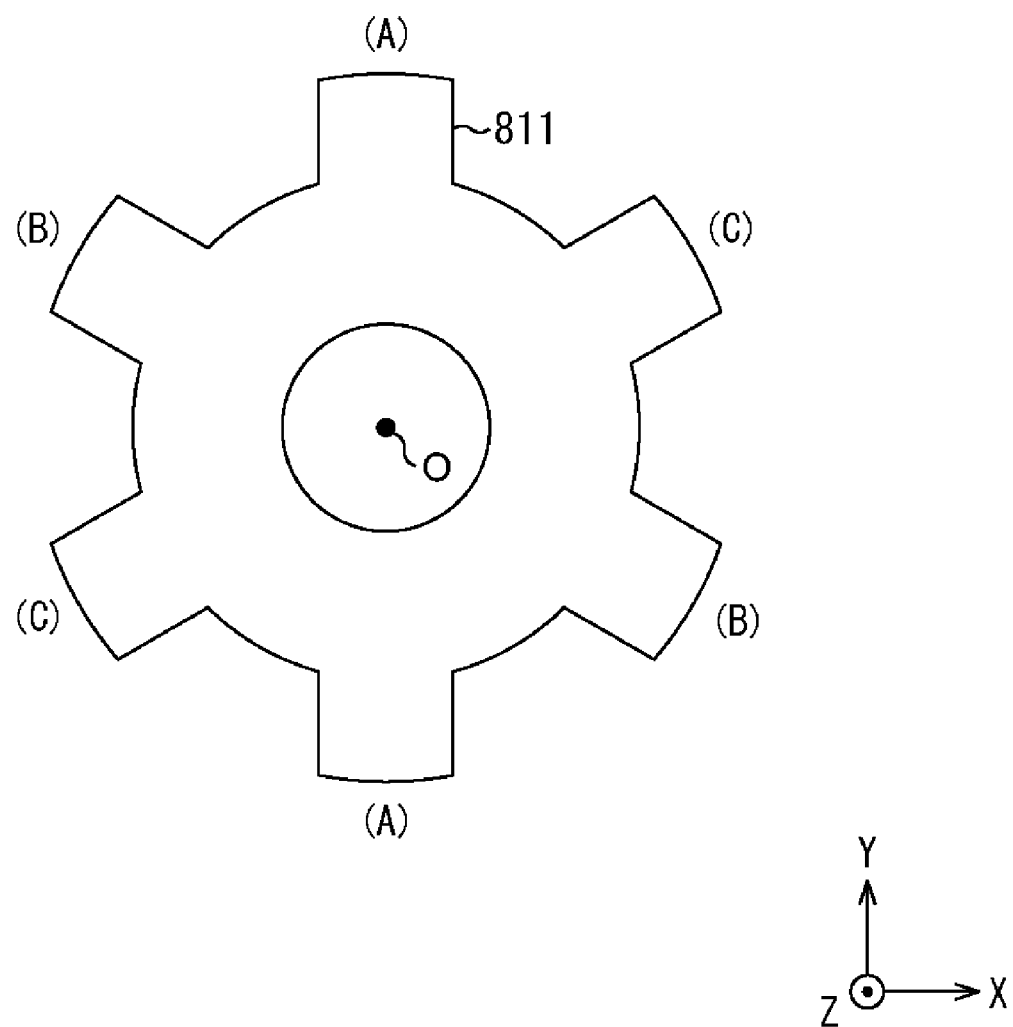
FIG. 11 is a view showing an example of a positional relationship of the electrical steel sheet in a height direction.

FIG. 11 is a view showing an example of the positional relationship of the electrical steel sheets 1000 in the height direction (Z-axis direction) in the rotor core 811 configured by rotationally laminating the electrical steel sheets 1000.

Here, a case where the electrical steel sheets 1000 shown in FIG. 10A are laminated with one electrical steel sheet 1000 regarded as a unit while a direction that serves as the reference of the electrical steel sheet 1000 of each electrical steel sheet 1000 is rotated around the axial center O of the rotor core 811 (electrical steel sheet 1000) as the rotating shaft in the counter-clockwise direction toward the paper surface by an angle of 360°÷the number of magnetic poles of the rotor core. Since the number of the magnetic poles of the rotor core 811 is six, a rotationally laminating angle for rotationally laminating the electrical steel sheets shifted becomes 60 (=360÷6°).

The magnetic pole (salient pole) whose centerline coincides with the direction of easy magnetization ED1 of the electrical steel sheet 1000 disposed uppermost (the first electrical steel sheet in the positive direction side of the Z axis) is (A), the magnetic pole (salient pole) whose centerline coincides with the direction of easy magnetization ED1 of the electrical steel sheet 1000 disposed second uppermost is (B), and the magnetic pole (salient pole) whose centerline coincides with the direction of easy magnetization ED1 of the electrical steel sheet 1000 disposed third uppermost is (C). The magnetic poles (salient poles) whose centerline coincides with the direction of easy magnetization ED1 of the electrical steel sheet 1000 disposed fourth uppermost and below also become, similar to those of the first to third uppermost electrical steel sheets, (A), (B) and (C) sequentially from above. That is, when n is defined as an integer of 1 or more, the magnetic poles (salient poles) whose centerline coincides with the direction of easy magnetization ED1 of the electrical steel sheet 300 disposed at the $n^{th}$, the $n+1^{th}$, the $n+2^{nd}$, and the $n+3^{rd}$ from above are (A), (B), and (C).

In such a case, in all of the magnetic poles (salient poles) of the rotor core 811, at least one electrical steel sheets 1000 in which the direction of easy magnetization ED1 or ED2 coincides with the centerlines of the magnetic poles is present. When the number of the electrical steel sheets 1000 configuring the rotor core 811 is set to a multiple of three, the numbers of the directions of easy magnetization ED1 or ED2 that coincide with the centerline of the magnetic pole become the same in all of the magnetic poles (salient poles) of the rotor core 811. For example, let us say that the number of the electrical steel sheets 1000 configuring the rotor core 811 is 300. In this case, in all of the magnetic poles (salient poles) of the rotor core 811, the numbers of the electrical steel sheets 1000 in which the direction of easy magnetization ED1 or ED2 coincides with the centerlines of the magnetic poles become 100 (=300÷3).

In addition, as described in the section (electrical steel sheet used for rotor core), final annealing and stress relief annealing are performed on the rotor core 811.

SUMMARY

As described above, in the present embodiment, the electrical steel sheets 1000 are rotationally laminated such that, in the rotor core 811, the number of magnetic poles (salient poles) whose centerline coincides with the direction of easy magnetization ED1 or ED2 of at least one electrical steel sheet 1000 is made to be larger than the number of magnetic poles (salient poles) whose centerline coincides with the direction of easy magnetization ED1 or ED2 in one electrical steel sheet 1000, thereby making the orientations of the directions of easy magnetization ED1 and ED2 of the electrical steel sheets 1000 periodically differ in the height direction (Z-axis direction). Therefore, even in a case where it is not possible to match the region of the direction of easy magnetization ED1 or ED2 to the centerlines of all of the magnetic poles (salient poles) of the rotor core 811 in one electrical steel sheet 1000, it is possible to realize both of the fact that the magnetic characteristics of the rotor core 111 in the circumferential direction become as uniform as possible and the fact that the uniform magnetic characteristics are made as excellent as possible.

In addition, in all of the magnetic poles (salient poles) of the rotor core 811, at least one electrical steel sheets 1000 in which the direction of easy magnetization ED1 or ED2 coincides with the centerlines of the magnetic poles is made to be present. In addition, in all of the magnetic poles (salient poles) whose centerline coincides with the direction of easy magnetization ED1 or ED2 of at least one electrical steel sheet 1000, the numbers of the electrical steel sheets 1000 in which the direction of easy magnetization ED1 or ED2 coincides with the centerlines of the magnetic poles are made to be the same. The magnetic characteristics of the rotor core 811 in the circumferential direction can be made more uniform by employing at least one of these configurations.

MODIFICATION EXAMPLES

Modification Example 1

The present embodiment has been described by taking the rotor core 811 of the switched reluctance motor as an example; however, in a case where the number of magnetic poles of a rotor core of a synchronous reluctance motor exceeds four, the same effect as in the present embodiment can be obtained by rotationally laminating electrical steel sheets in the same manner as described in the present embodiment. That is, the present embodiment can also be applied to the second embodiment.

Modification Example 2

As described above, the number of magnetic poles of a rotor core may not be a multiple of four or may be a multiple of four. In addition, the number of magnetic poles of the rotor core may also be four (even when the number of the magnetic poles of the rotor core is four, electrical steel sheets can be laminated rotationally as in the present embodiment). Here, the magnetic characteristics in the directions of easy magnetization ED1 and ED2 almost coincide with each other, but are not strictly the same. Therefore, even when the number of magnetic poles of the rotor core is four, the effect on making the magnetic characteristics in the circumferential direction of the rotor core uniform can be obtained by rotationally laminating the electrical steel sheets (although the effect becomes weak compared with a case where the number of magnetic poles of the rotor core is a multiple of four such as eight or more). In addition, for example, in a case where the electrical steel sheet 1000 is formed by blanking, it is possible to suppress the alignment of burrs formed on the electrical steel sheet at the time of the blanking, and it is possible to further improve the magnetic characteristics of the rotor core.

Modification Example 3

The changes in the orientations of the directions of easy magnetization ED1 and ED2 of the electrical steel sheet 1000 in the height direction (Z-axis direction) may not be periodic. For example, at the time of configuring a stator core 611 of the present embodiment, the angle for rotationally laminating the electric steel sheets may be set to 60°, the number of times of rotationally laminating the electric steel sheets per period may be set to five, and the orientations of the directions of easy magnetization ED1 and ED2 of the electrical steel sheet 1000 may be prevented from returning to the original.

Additionally, in the present embodiment as well, a variety of modification examples described in the first and second embodiments can be employed.

The embodiments of the present invention described above are all merely specific examples of carrying out the present invention, and the technical scope of the present invention should not be construed in a limited manner by these embodiments. That is, the present invention can be carried out in a variety of forms without departing from the technical idea or main features of the present invention.

INDUSTRIAL APPLICABILITY

According to the present invention, it is possible to improve the magnetic characteristics of rotors. Therefore, the present disclosure is highly industrially applicable.

BRIEF DESCRIPTION OF THE REFERENCE SYMBOLS

100,400,800: Rotating electric machine
110,410,810: Rotor 111,411,811: Rotor core
120: Stator
300,700,1000: Electrical steel sheet
310,710,1010: rolling direction
ED1 and ED2: Direction of easy magnetization

The invention claimed is:

1. A rotor core of a reluctance motor or a reluctance generator, the rotor core comprising:
a plurality of electrical steel sheets,
wherein the electrical steel sheet has a chemical composition containing,
by mass %,
C: 0.0100% or less,
Si: 1.50% to 4.00%,
sol. Al: 0.0001% to 1.0%,
S: 0.0100% or less,
N: 0.0100% or less,
one or more selected from the group of Mn, Ni, Co, Pt, Pb, Cu, and Au: 2.50% to 5.00% in total,
Sn: 0.000% to 0.400%,
Sb: 0.000% to 0.400%,
P: 0.000% to 0.400%, and
one or more selected from the group of Mg, Ca, Sr, Ba, Ce, La, Nd, Pr, Zn, and Cd: 0.0000% to 0.0100% in total,
in which, when a Mn content (mass %) is indicated by (Mn), a Ni content (mass %) is indicated by (Ni), a Co content (mass %) is indicated by (Co), a Pt content (mass %) is indicated by (Pt), a Pb content (mass %) is indicated by (Pb), a Cu content (mass %) is indicated by (Cu), an Au content (mass %) is indicated by (Au), a Si content (mass %) is indicated by (Si), and a sol. Al content (mass %) is indicated by (sol. Al), Formula (A) below is satisfied, and
a remainder includes Fe and impurities,
when a B50 in a rolling direction is indicated by B50L, a B50 in a direction at an angle of 90° with respect to the rolling direction is indicated by B50C, and, between B50 in two directions, a one direction of the two directions in which a smaller angle of a plurality of angles with respect to the rolling direction is 45°, another direction of the two directions in which another angle of the plurality of angles with respect to the rolling direction is 135°, a B50 in one direction is indicated by B50D1, a B50 in the other direction is indicated by B50D2, Formula (B) and Formula (C) below are satisfied, and an X-ray random intensity ratio in {100}<011> is 5 or more and less than 30, and
a sheet thickness is 0.50 mm or less, $$((Mn)+(Ni)+(Co)+(Pt)+(Pb)+(Cu)+(Au))-((Si)+(sol.\ Al))>0\%  \quad (A),$$

$$(B50D1+B50D2)/2>1.7\ T \quad (B),\ and$$

$$(B50D1+B50D2)/2>(B50L+B50C)/2 \quad (C).$$

2. The rotor core according to claim 1,
wherein Formula (D) below is satisfied, $$(B50D1+B50D2)/2>1.1\times(B50L+B50C)/2 \quad (D).$$

3. A rotor of the reluctance motor or the reluctance generator, comprising:
the rotor core according to claim 2,
wherein a centerline in a circumferential direction of at least one magnetic pole of the rotor coincides with a direction in which magnetic characteristics of at least one of the electrical steel sheets are most excellent, and
the direction in which the magnetic characteristics are most excellent is at least any one of the two directions in which a smaller angle of a plurality of angles with respect to the rolling direction is 45°.

4. The rotor core according to claim 1,
wherein Formula (E) below is satisfied, $$(B50D1+B50D2)/2>1.2\times(B50L+B50C)/2 \quad (E).$$

5. A rotor of the reluctance motor or the reluctance generator, comprising:
the rotor core according to claim 4,
wherein a centerline in a circumferential direction of at least one magnetic pole of the rotor coincides with a direction in which magnetic characteristics of at least one of the electrical steel sheets are most excellent, and
the direction in which the magnetic characteristics are most excellent is at least any one of the two directions in which a smaller angle of a plurality of angles with respect to the rolling direction is 45°.

6. The rotor core according to claim 1,
wherein Formula (F) below is satisfied, $$(B50D1+B50D2)/2>1.8\ T \quad (F).$$

7. A rotor of the reluctance motor or the reluctance generator, comprising:
the rotor core according to claim 6,
wherein a centerline in a circumferential direction of at least one magnetic pole of the rotor coincides with a direction in which magnetic characteristics of at least one of the electrical steel sheets are most excellent, and
the direction in which the magnetic characteristics are most excellent is at least any one of the two directions in which a smaller angle of a plurality of angles with respect to the rolling direction is 45°.

8. A rotor of the reluctance motor or the reluctance generator, comprising:
the rotor core according to claim 1,
wherein a centerline in a circumferential direction of at least one magnetic pole of the rotor coincides with a direction in which magnetic characteristics of at least one of the electrical steel sheets are most excellent, and
the direction in which the magnetic characteristics are most excellent is at least any one of the two directions in which a smaller angle of a plurality of angles with respect to the rolling direction is 45°.

9. The rotor according to claim 8,
wherein the number of the magnetic poles of the rotor is a multiple of four,
two of the magnetic poles are positioned at positions facing each other via an axial center in a first direction between two directions in which the magnetic characteristics of at least one of the electrical steel sheets are most excellent,
two of the magnetic poles are positioned at positions facing each other via an axial center in a second direction between the two directions in which the magnetic characteristics of at least one of the electrical steel sheets are most excellent,
the centerlines in the circumferential direction of the two magnetic poles positioned at the positions facing each other via the axial center in the first direction coincide with the first direction of the at least one electrical steel sheet, and the centerlines in the circumferential direction of the two magnetic poles positioned at the positions facing each other via the axial center in the second direction coincide with the second direction of the at least one electrical steel sheet.

10. The rotor according to claim 9,
wherein the number of the magnetic poles of the rotor is four,
the centerlines in the circumferential direction of the two magnetic poles positioned at the positions facing each other via the axial center in the first direction coincide with the first direction of the plurality of electrical steel sheets, and
the centerlines in the circumferential direction of the two magnetic poles positioned at the positions facing each other via the axial center in the second direction coincide with the second direction of the plurality of electrical steel sheets.

11. The rotor according to claim 10,
wherein the plurality of electrical steel sheets are laminated in a state in which orientations of two directions in which the magnetic characteristics are most excellent deviate from each other.

12. The rotor according to claim 9,
wherein the plurality of electrical steel sheets are laminated in a state in which orientations of two directions in which the magnetic characteristics are most excellent deviate from each other.

13. The rotor according to claim 9,
wherein the plurality of electrical steel sheets are laminated in a state in which orientations of two directions in which the magnetic characteristics are most excellent periodically deviate from each other in a lamination direction of the electrical steel sheets.

14. The rotor according to claim 8,
wherein the plurality of electrical steel sheets are laminated in a state in which orientations of two directions in which the magnetic characteristics are most excellent deviate from each other.

15. The rotor according to claim 8,
wherein the plurality of electrical steel sheets are laminated in a state in which orientations of two directions in which the magnetic characteristics are most excellent periodically deviate from each other in a lamination direction of the electrical steel sheets.

16. The rotor according to claim 8,
wherein, in all of the magnetic poles whose centerline in the circumferential direction coincides with the direction in which the magnetic characteristics of at least one of the electrical steel sheets are most excellent, the numbers of the electrical steel sheets in which the direction in which the magnetic characteristics of the electrical steel sheet are most excellent coincides with the centerline in the circumferential direction of the magnetic pole are the same.

17. The rotor according to claim 8,
wherein, in all of the magnetic poles, at least one electrical steel sheet in which the direction in which the magnetic characteristics are most excellent coincides with the centerline in the circumferential direction of the magnetic pole is included.

18. The rotor according to claim 8,
wherein, in each of the plurality of electrical steel sheets, as the direction in which the magnetic characteristics are most excellent, there is at least one direction that coincides with the centerline in the circumferential direction of the magnetic pole.

19. The rotor according to claim 8,
wherein, in each of the plurality of electrical steel sheets, positional relationships of regions configuring each magnetic pole of the electrical steel sheet with respect to a rolling direction are the same.

20. A rotating electric machine comprising:
the rotor according to claim 8, the rotating electric machine being the reluctance motor or the reluctance generator.

* * * * *